Figure 9:
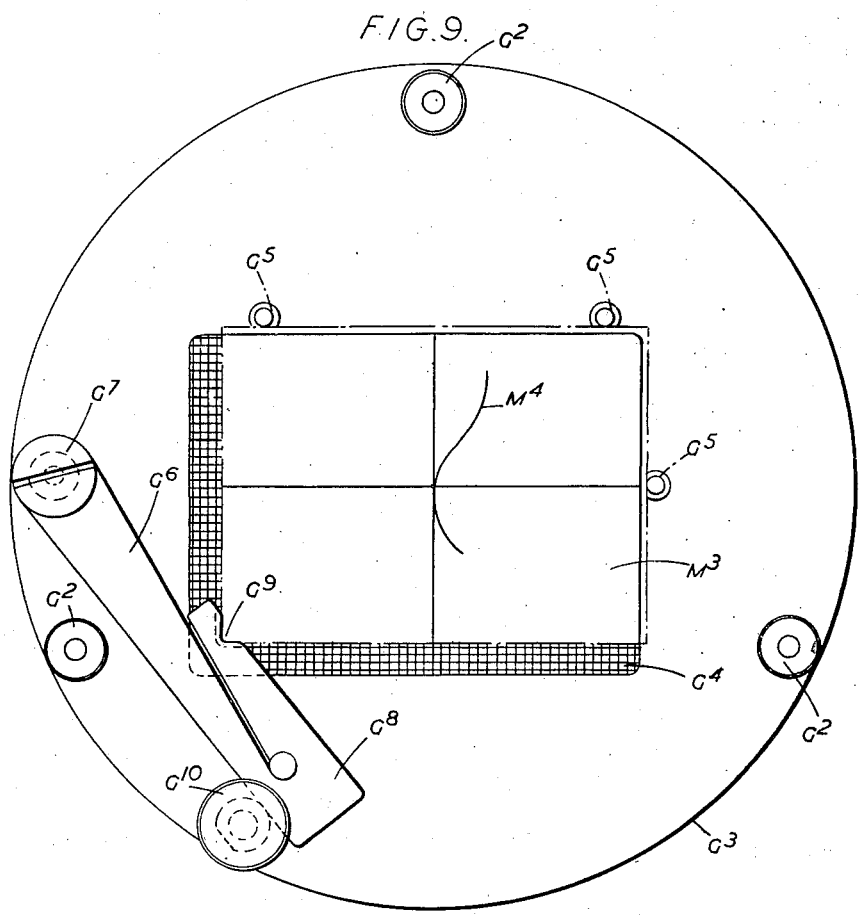

Feb. 1, 1949. E. A. COOKE 2,460,491
COPYING MACHINE WITH OPTICAL SYSTEM
Filed Sept. 21, 1944 21 Sheets-Sheet 1
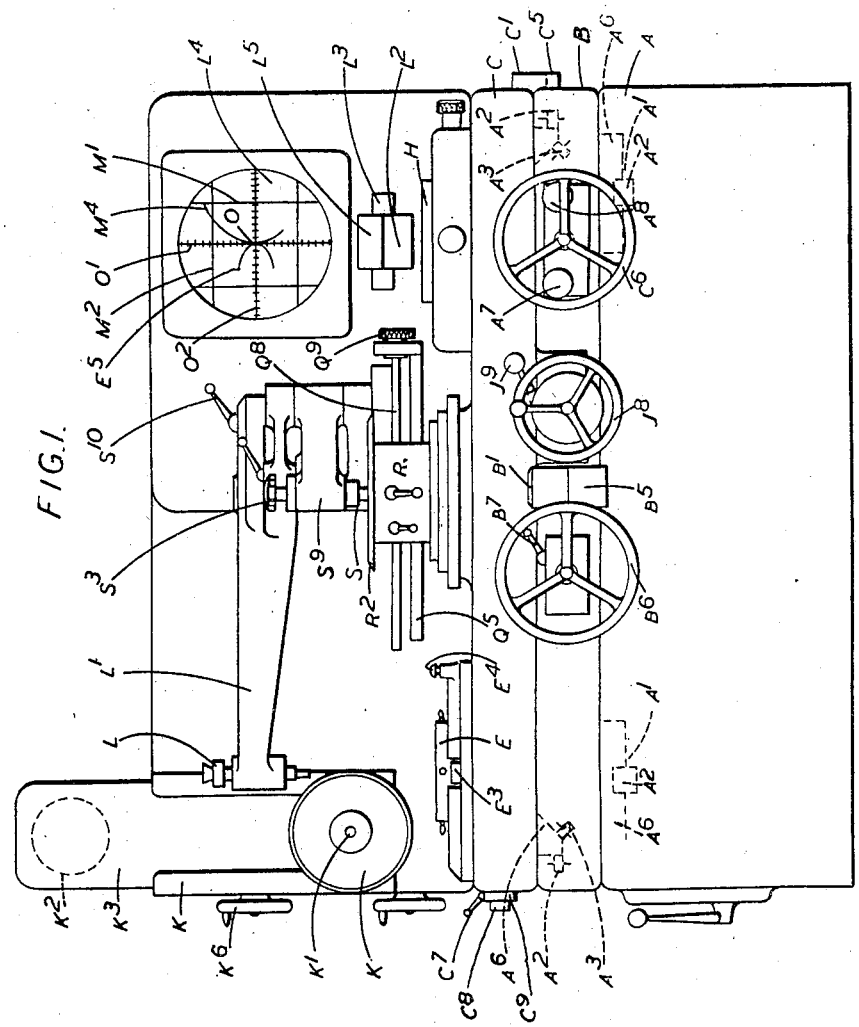
Inventor
ERNEST ALBERT COOKE
By
Evans, Holcombe & Blair
Attorney

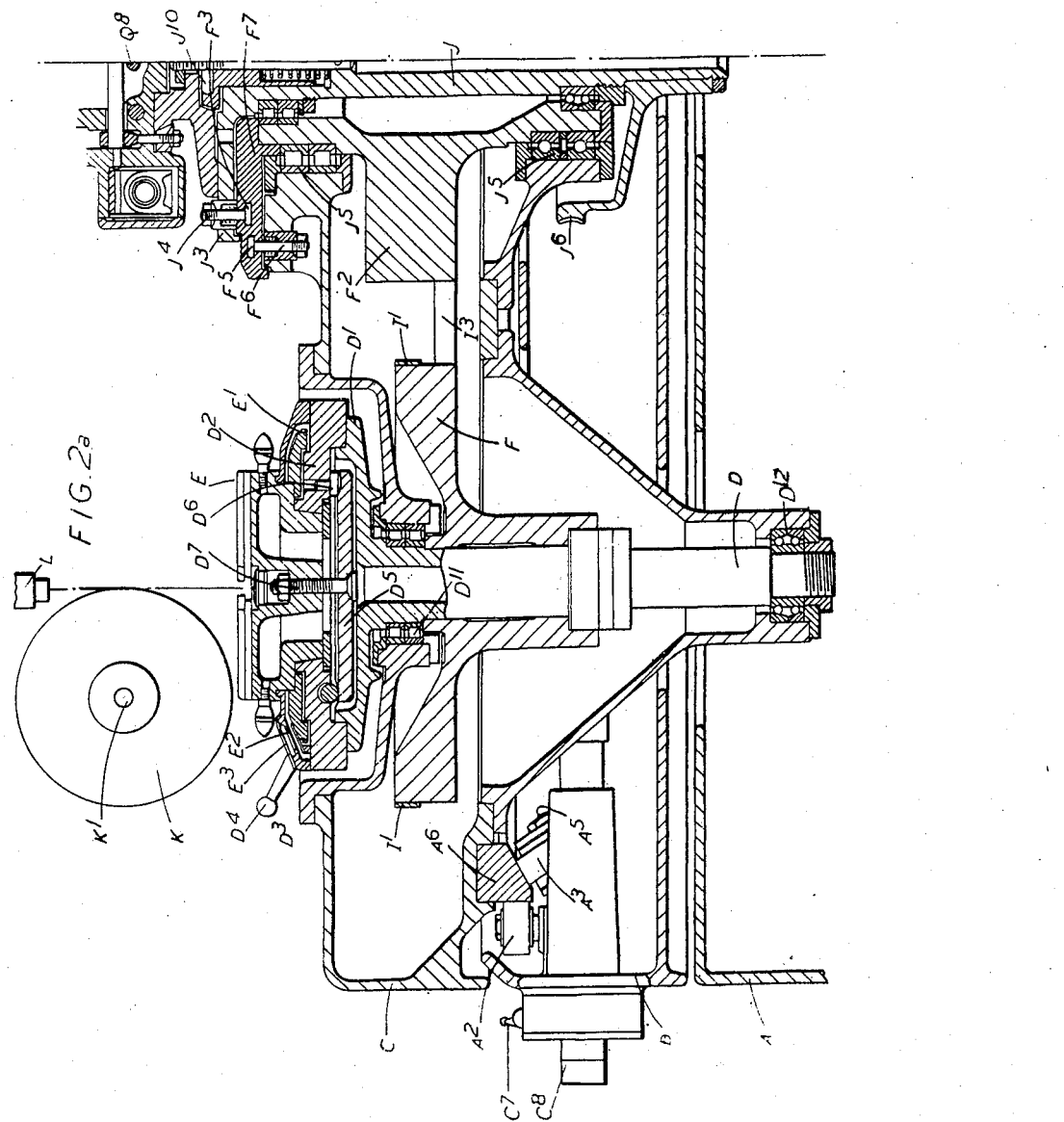

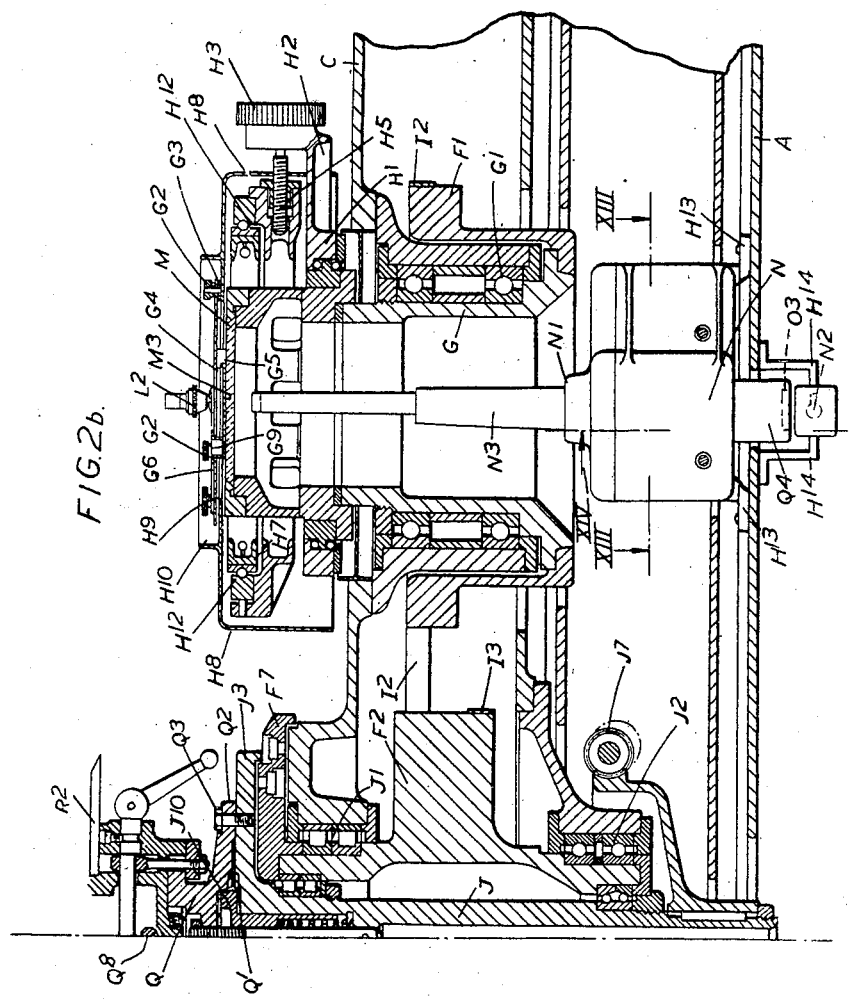

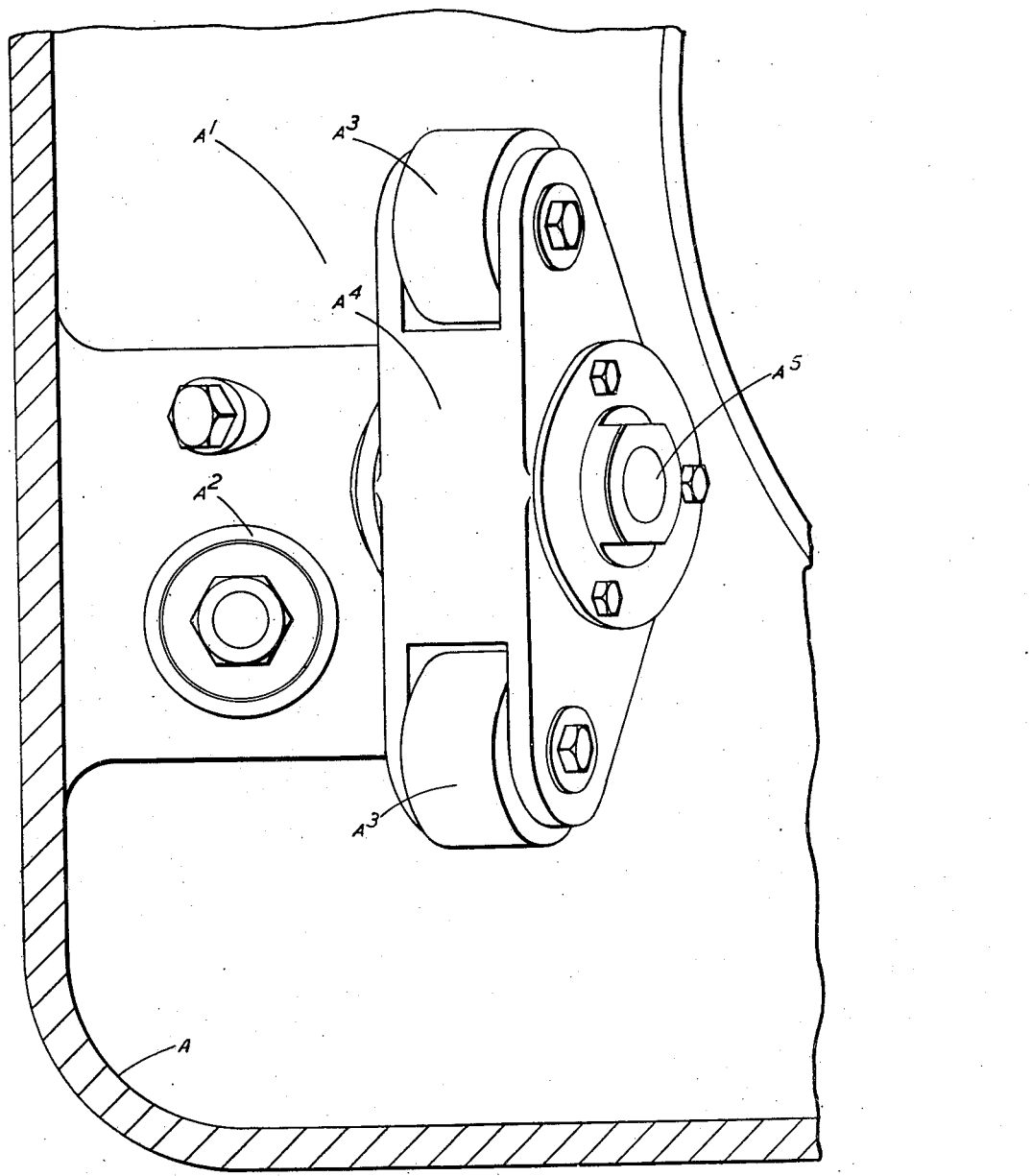

Feb. 1, 1949.    E. A. COOKE    2,460,491
COPYING MACHINE WITH OPTICAL SYSTEM
Filed Sept. 21, 1944    21 Sheets-Sheet 5
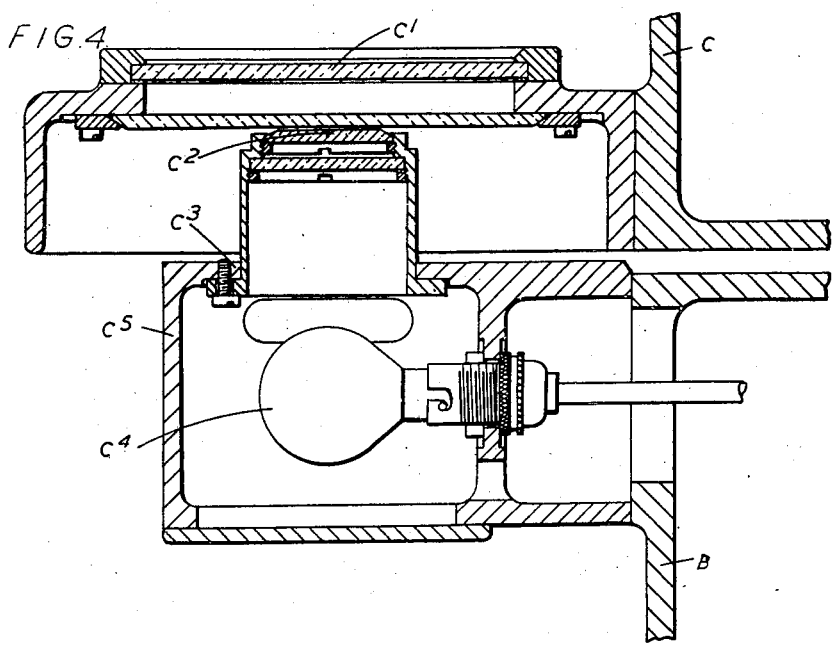
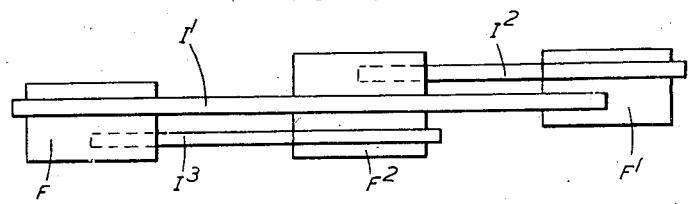
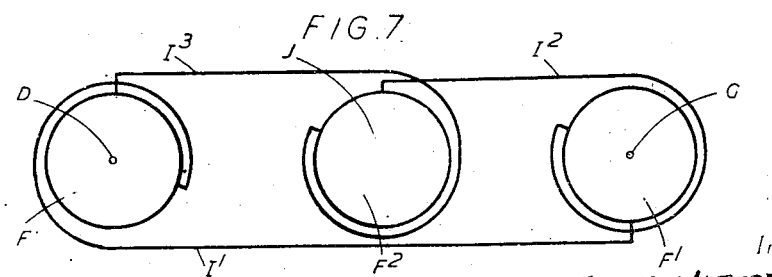
Inventor
ERNEST ALBERT COOKE
By
Emery, Holcombe & Blair
Attorneys

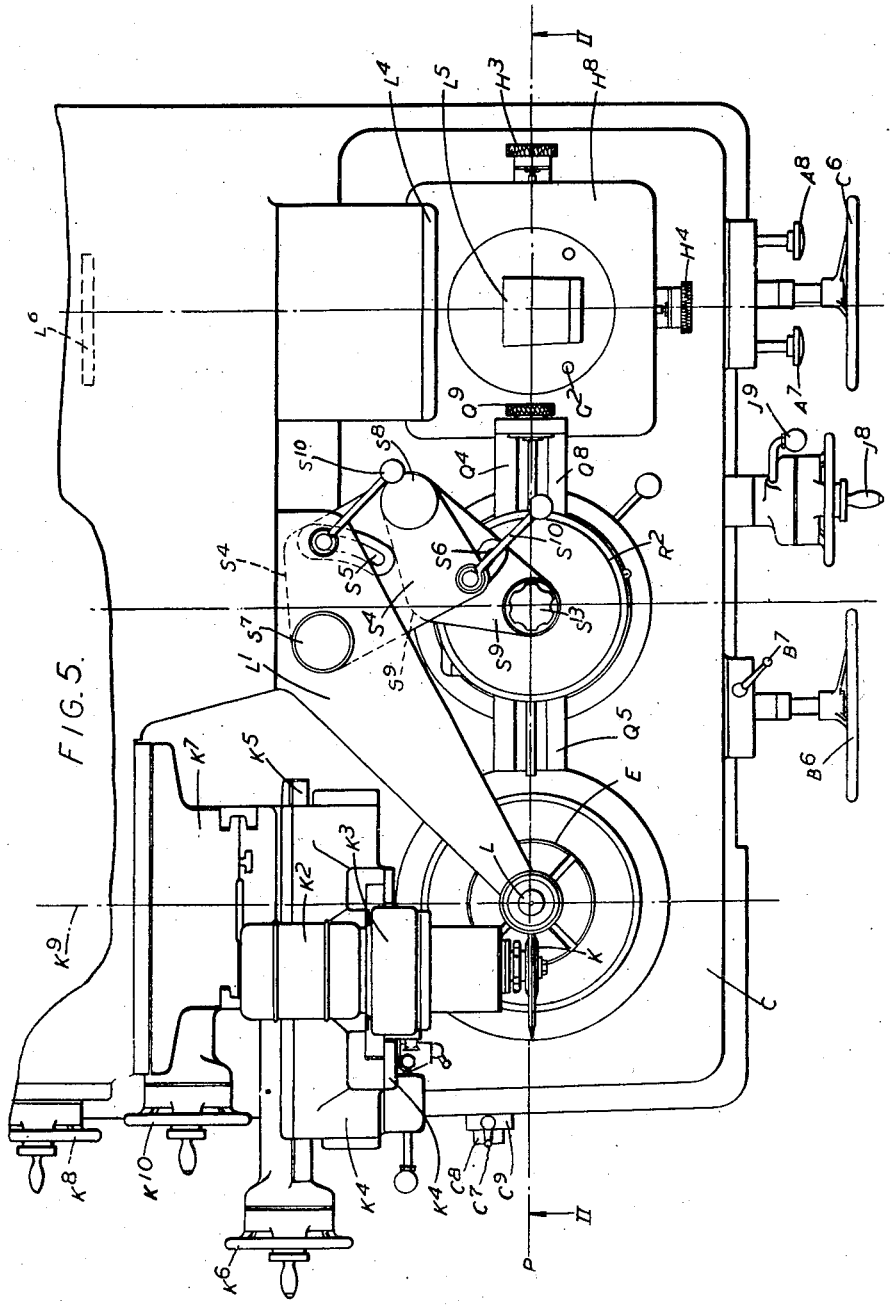

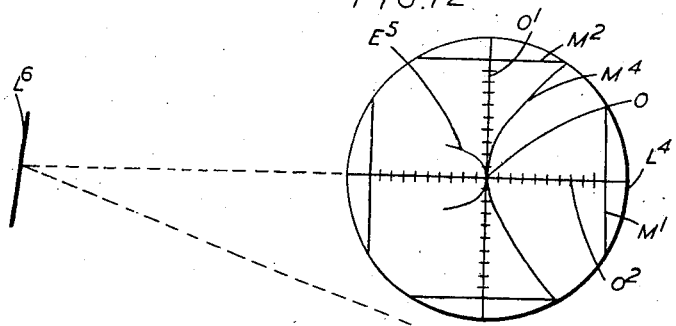
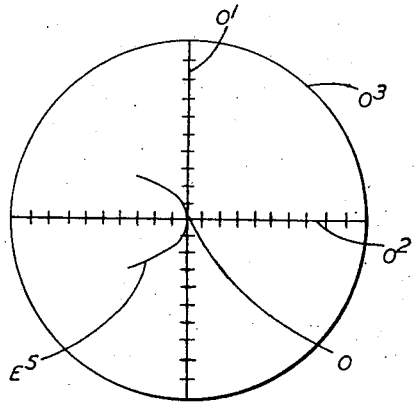
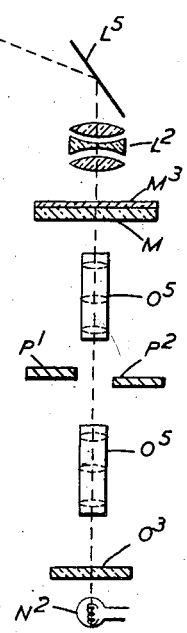
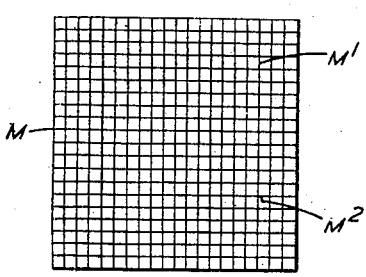
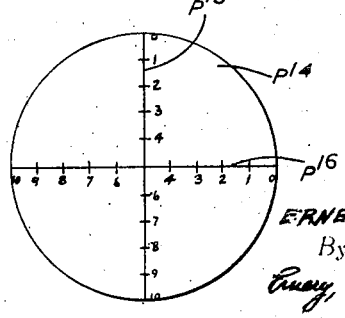
Inventor
ERNEST ALBERT COOKE
By
Attorney Feb. 1, 1949.　　　　　E. A. COOKE　　　2,460,491
COPYING MACHINE WITH OPTICAL SYSTEM
Filed Sept. 21, 1944　　　　　　　　　　21 Sheets-Sheet 8

Inventor
ERNEST ALBERT COOKE
By
Attorney

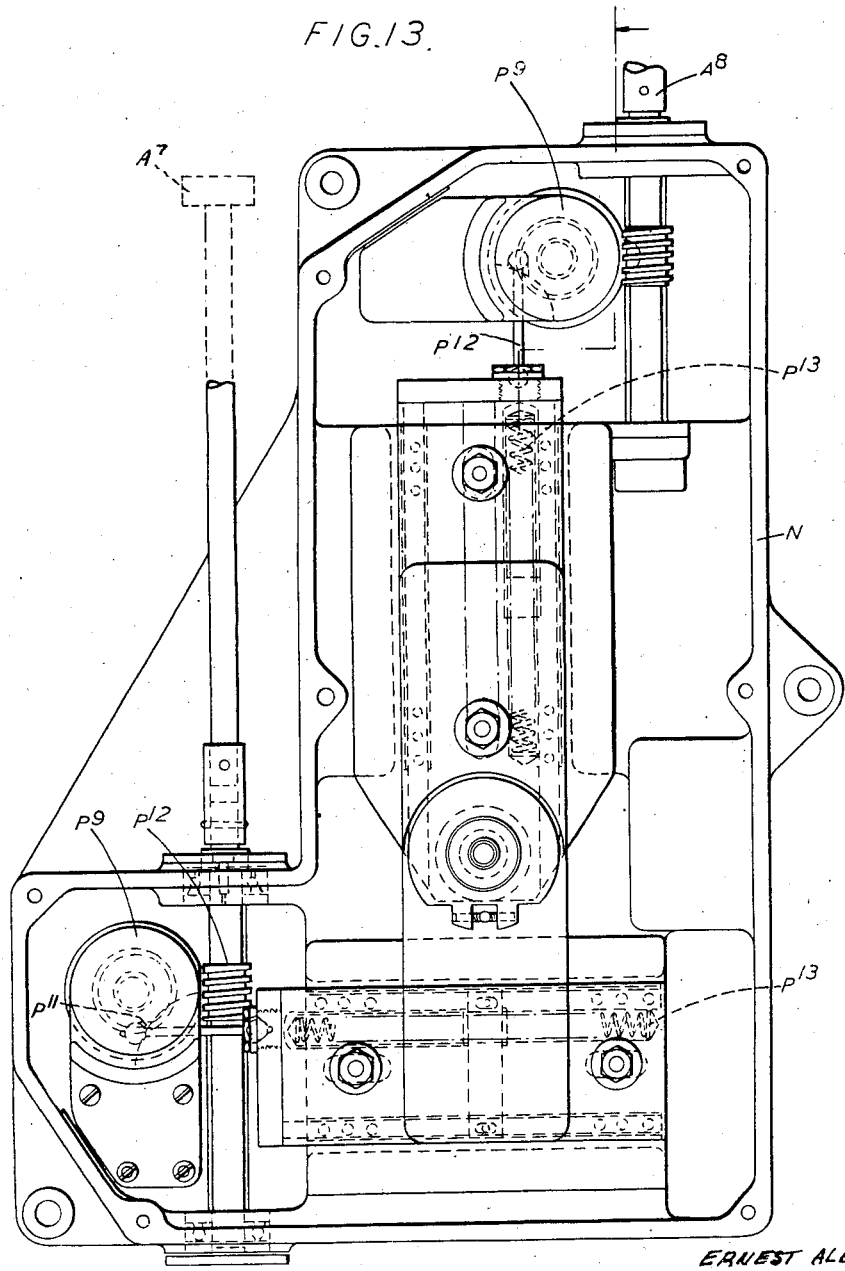

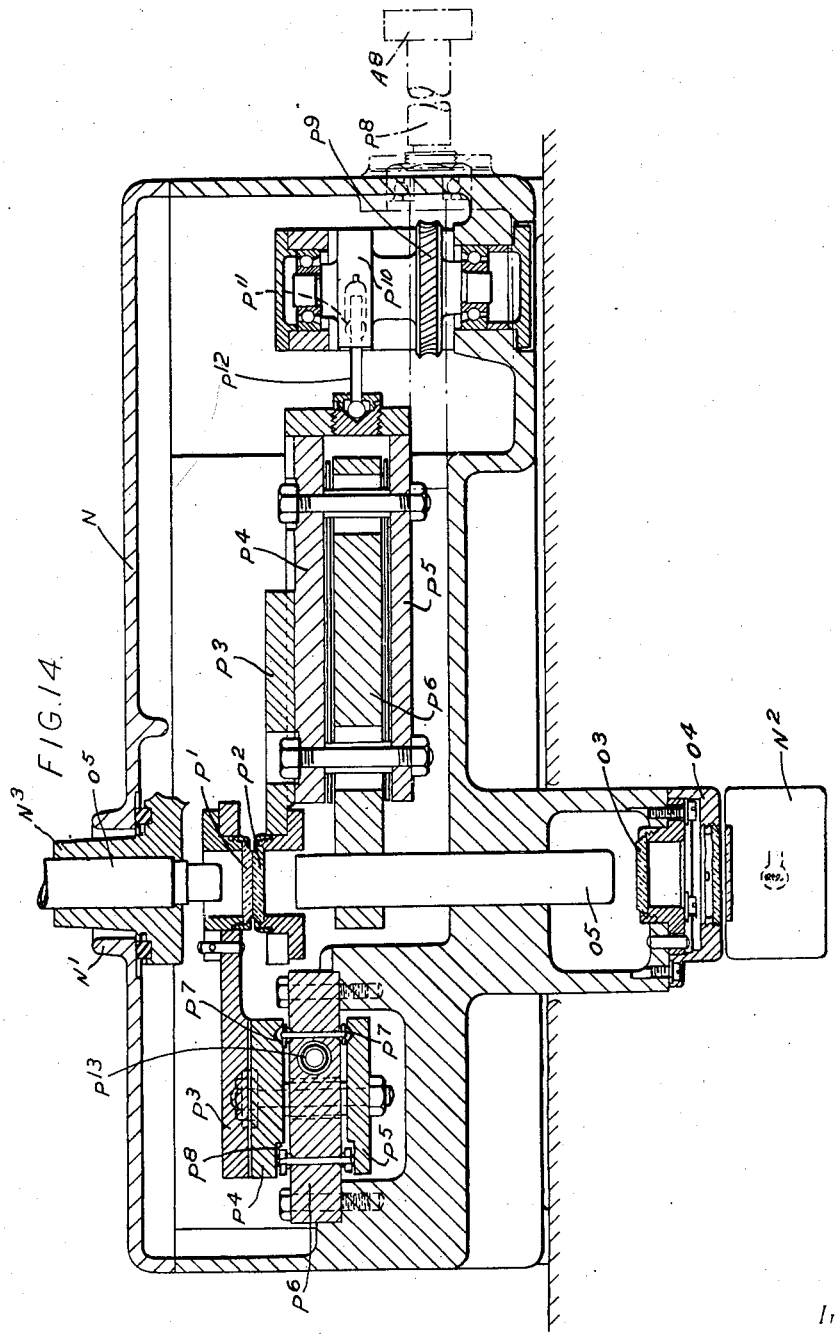

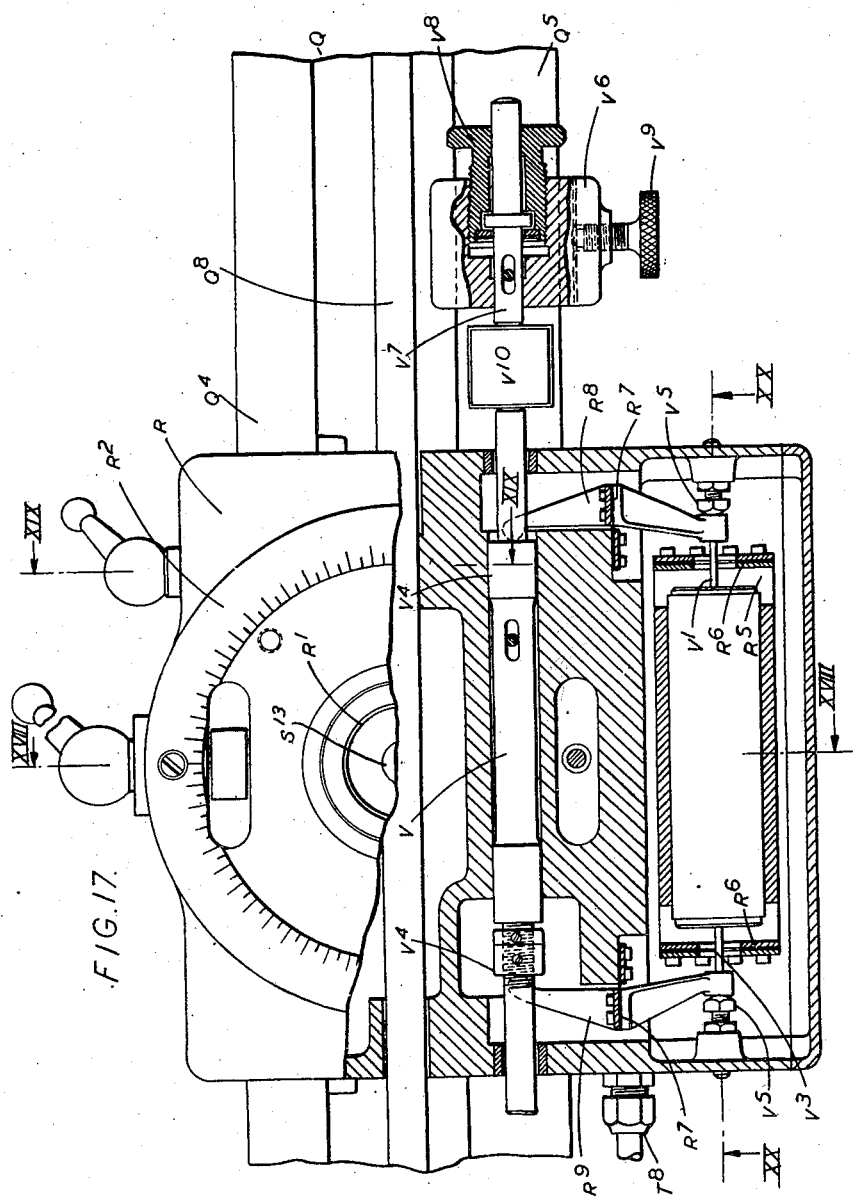

Feb. 1, 1949. E. A. COOKE 2,460,491
COPYING MACHINE WITH OPTICAL SYSTEM
Filed Sept. 21, 1944 21 Sheets-Sheet 13
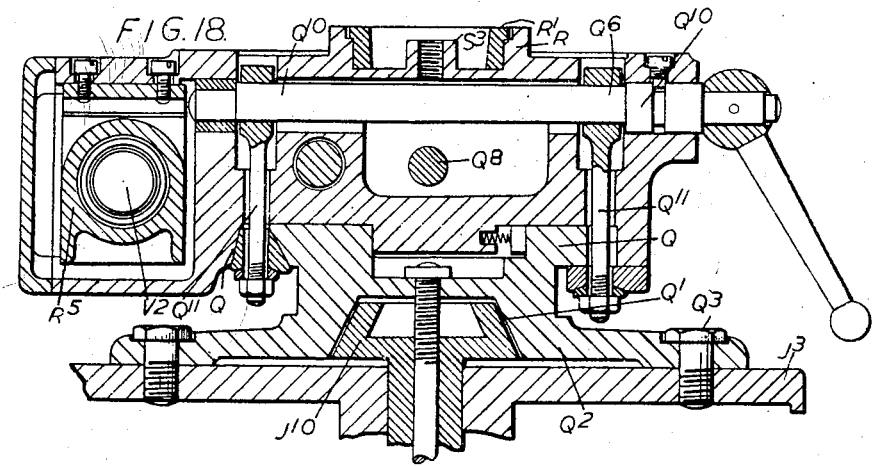
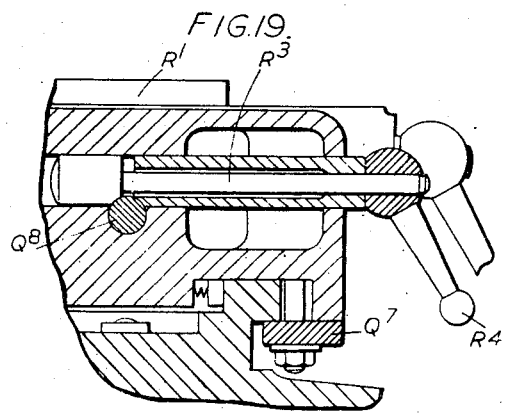
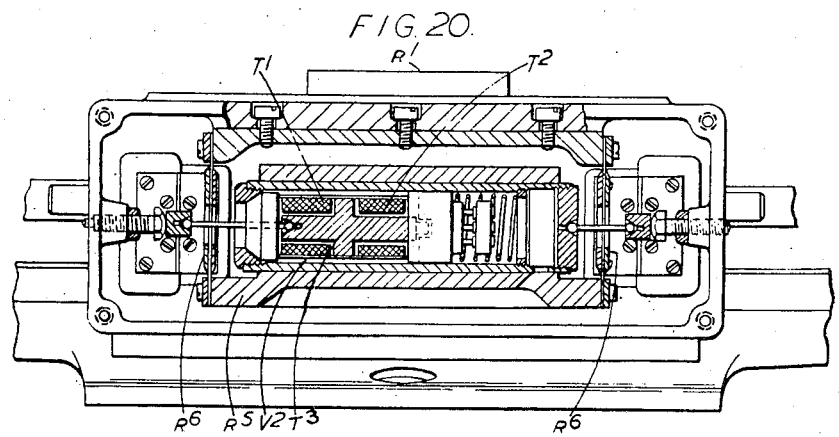
Inventor
ERNEST ALBERT COOKE
By Emery Holcombe H Blair
Attorney Feb. 1, 1949.  E. A. COOKE  2,460,491
COPYING MACHINE WITH OPTICAL SYSTEM
Filed Sept. 21, 1944  21 Sheets-Sheet 14
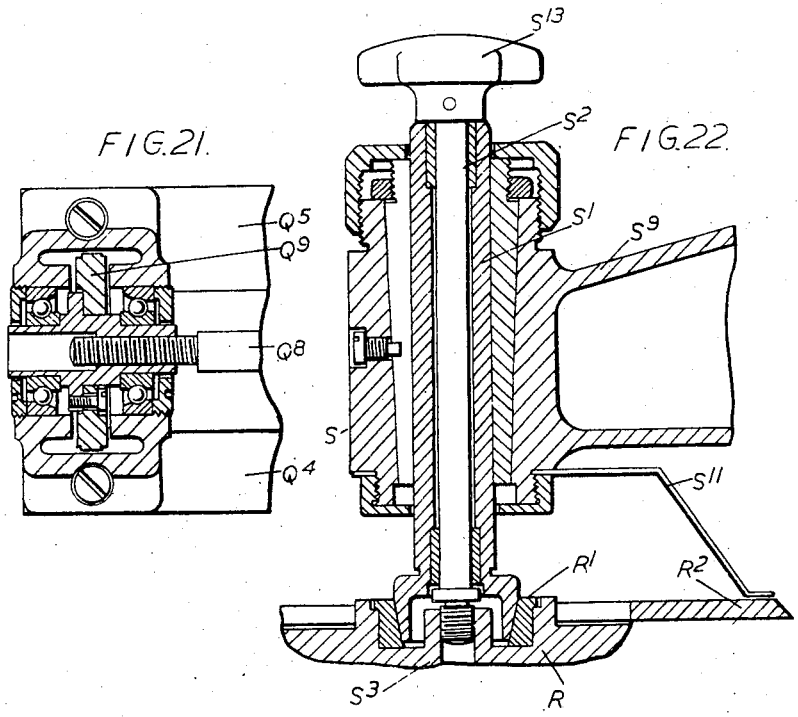
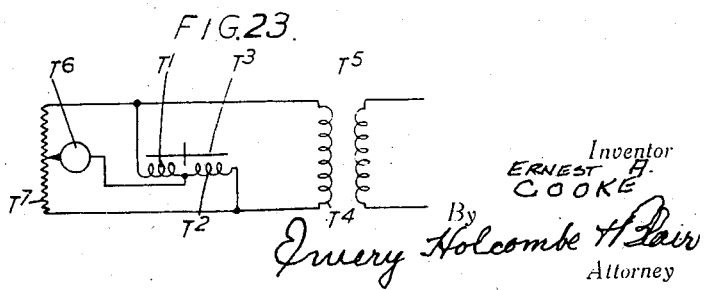

Inventor
ERNEST ALBERT COOKE
By
Emery, Holcombe & Blair
Attorney

Feb. 1, 1949.  E. A. COOKE  2,460,491
COPYING MACHINE WITH OPTICAL SYSTEM
Filed Sept. 21, 1944  21 Sheets-Sheet 17
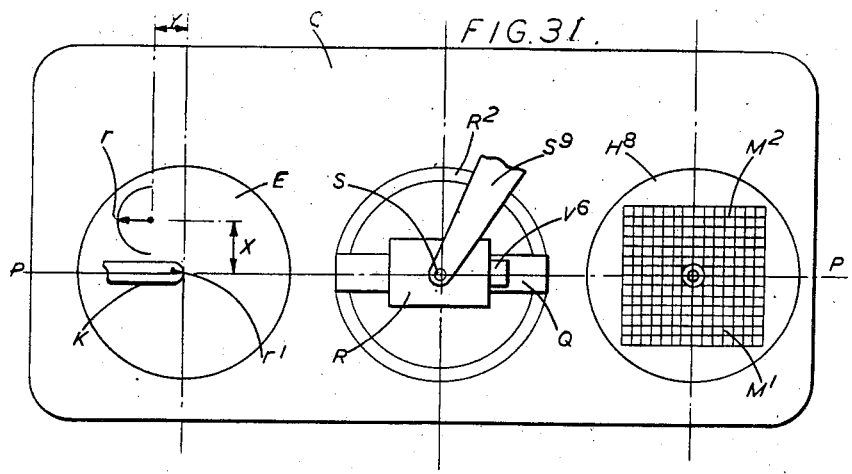
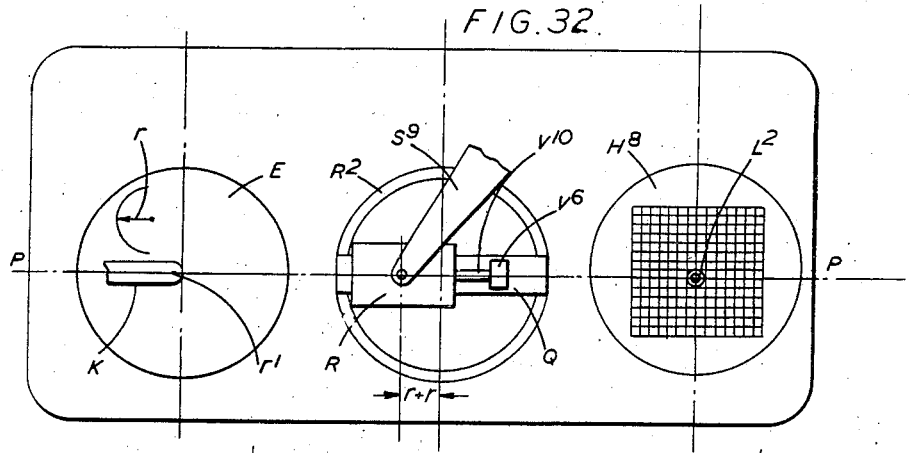
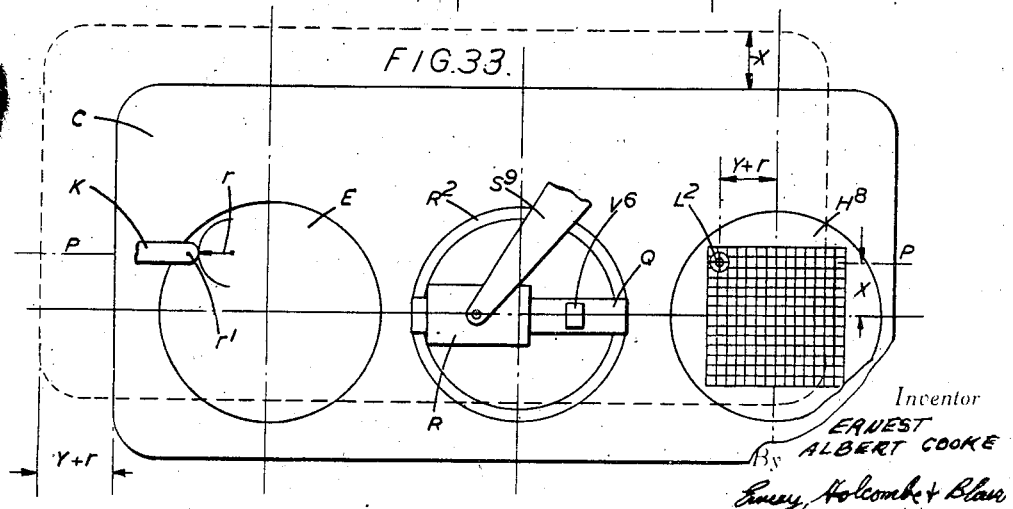
Inventor
ERNEST ALBERT COOKE Feb. 1, 1949. E. A. COOKE 2,460,491
COPYING MACHINE WITH OPTICAL SYSTEM
Filed Sept. 21, 1944 21 Sheets-Sheet 18
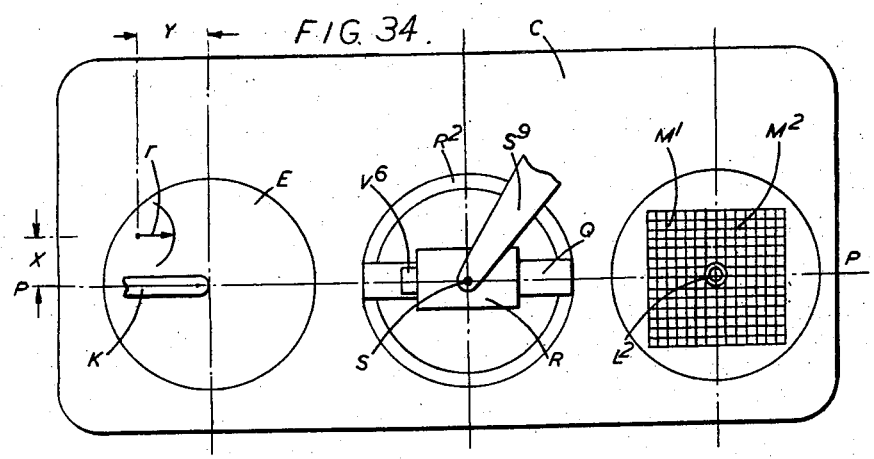
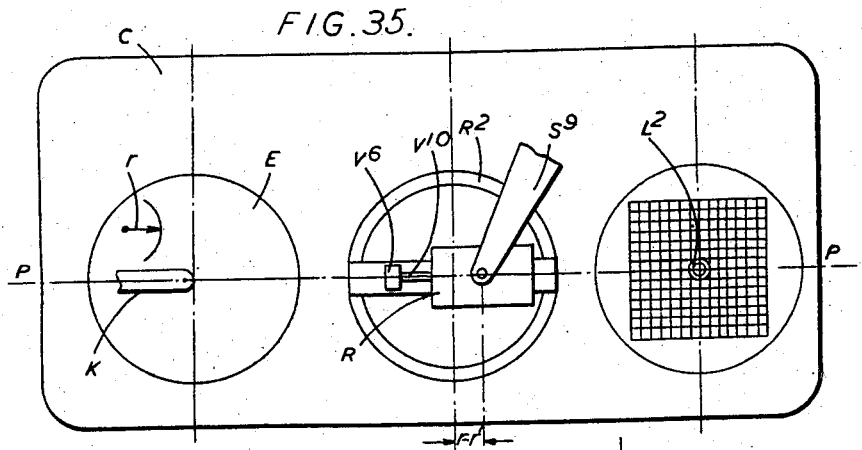
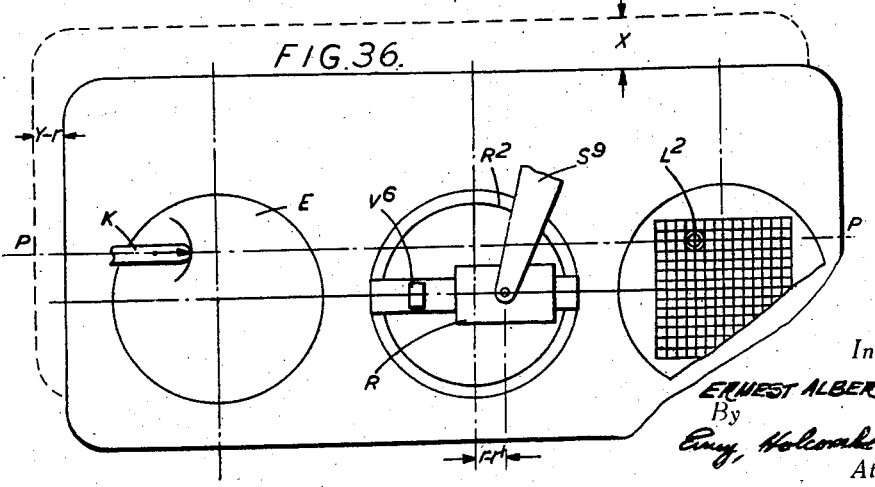
Inventor
ERNEST ALBERT COOKE
By
Attorney

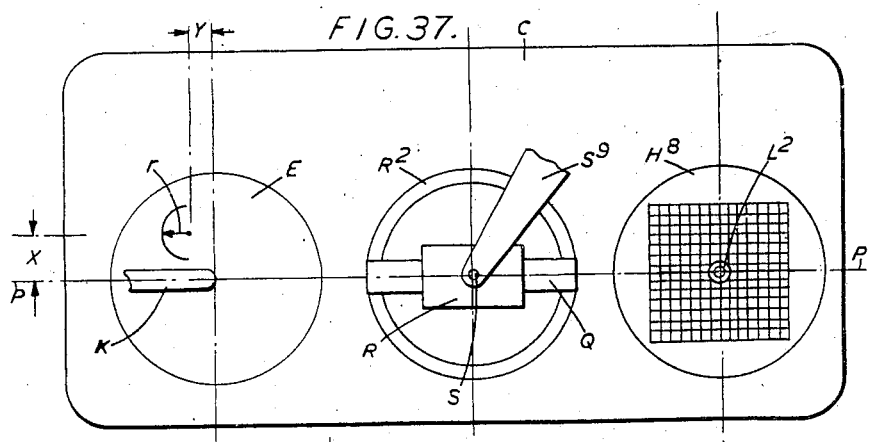
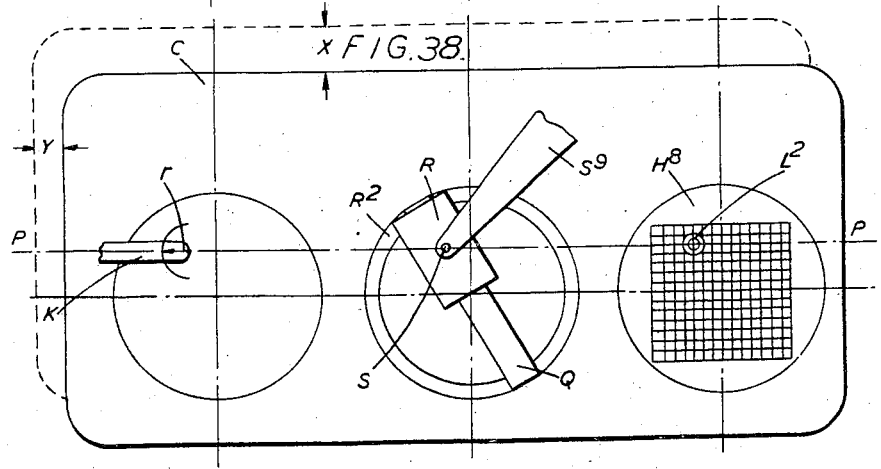
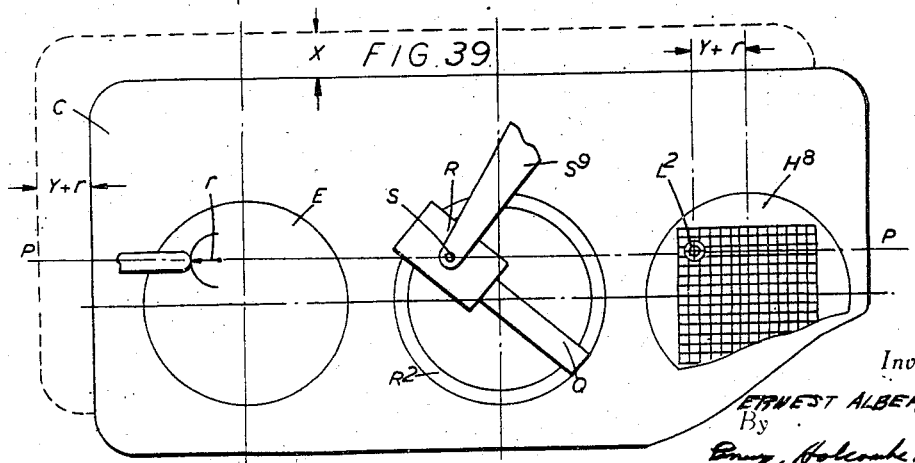

Feb. 1, 1949.  E. A. COOKE  2,460,491
COPYING MACHINE WITH OPTICAL SYSTEM
Filed Sept. 21, 1944  21 Sheets-Sheet 20
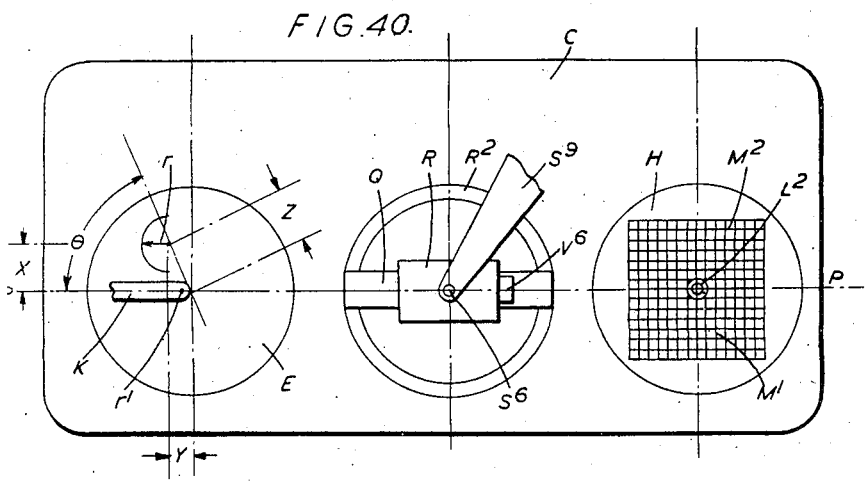
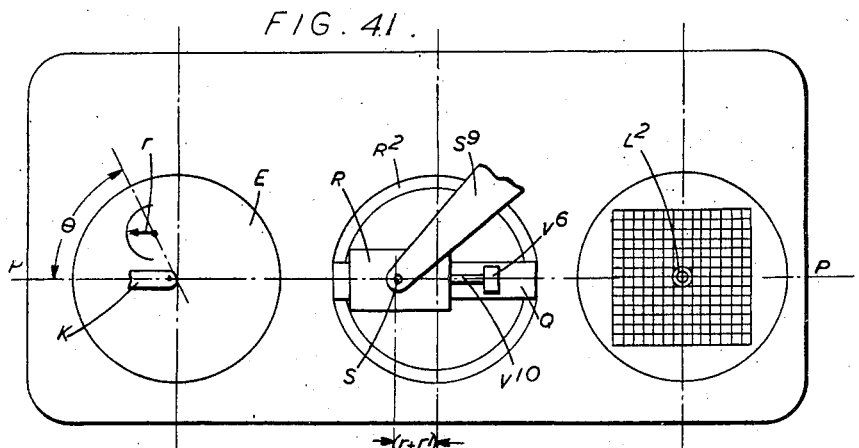
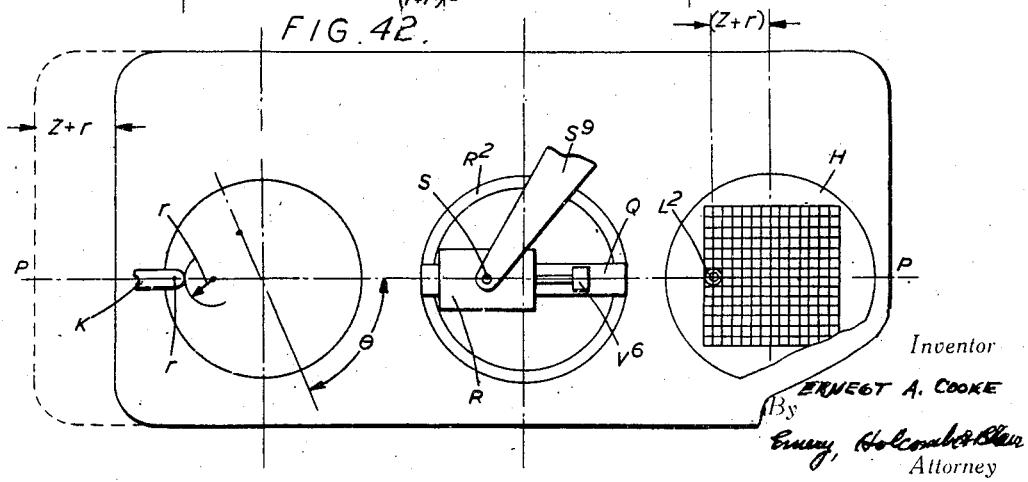

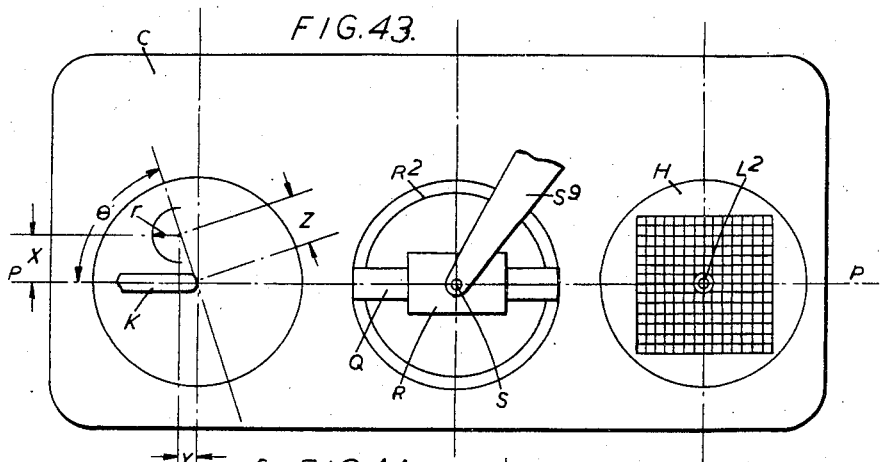
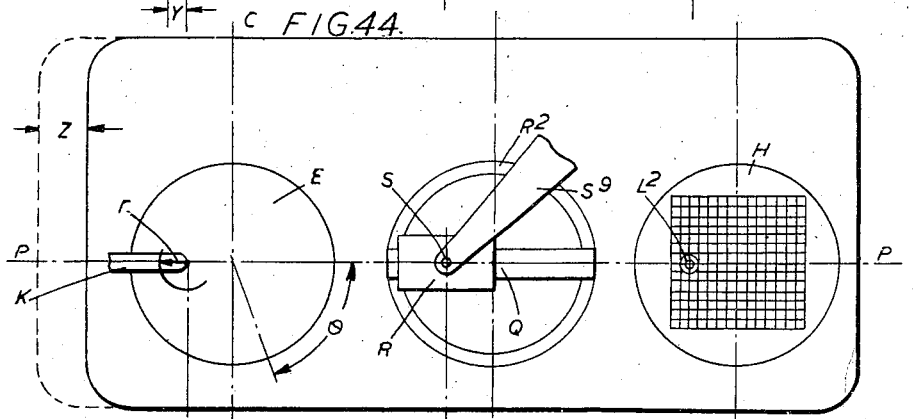
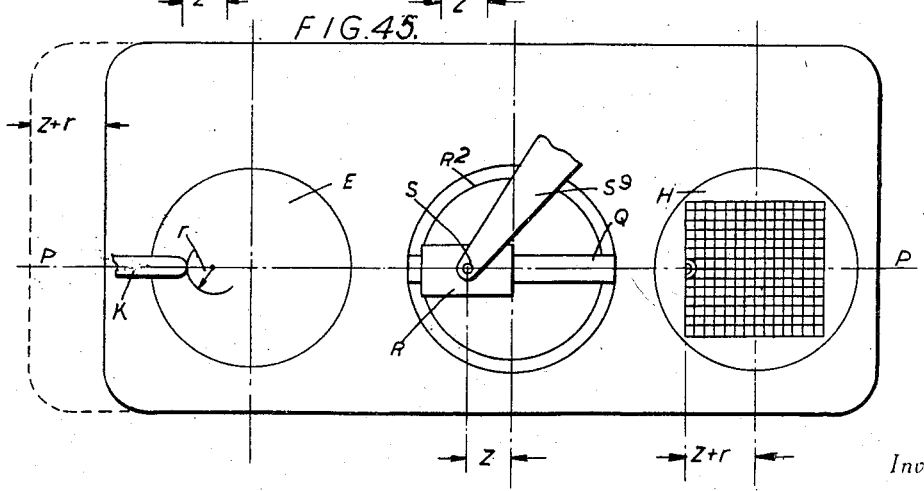

Patented Feb. 1, 1949

2,460,491

UNITED STATES PATENT OFFICE 2,460,491

COPYING MACHINE WITH OPTICAL SYSTEM

Ernest Albert Cooke, Leicester, England, assignor to Taylor, Taylor & Hobson Limited, Leicester, England, a company of Great Britain Application September 21, 1944, Serial No. 555,180
In Great Britain July 19, 1943

39 Claims. (Cl. 51—165)

This invention relates to copying machines of the kind comprising a work support, a tool support, a copy support, a tracer or datum for following the outline of the copy, and means interconnecting these parts in such a manner as to produce relative movement between the tool and the work which is a reproduction, either to scale or at unity ratio, of the relative movement of the tracer and the copy. The nature of the tool depends upon the operation to be performed on the work and the tool may consist, for example, of an abrasive wheel or an end mill for grinding or cutting the work, or of a stylus or other marking device for imparting surface markings to the work. Similarly, the tracer may be constituted by a stylus, a copy microscope or a projection objective whereby the outline of the copy is projected onto a screen.

In existing machines of this kind it is usual to arrange the work support and copy support on shafts carried by a main carriage whereby the work and copy supports can be adjusted relatively to a primary plane containing the axes of the tool and tracer, the work and copy supports being interconnected by toothed gearing or flexible bands so that they can be rotated in synchronism for orientation purposes, e. g. for straight line or translatory grinding and for circular arc and gyratory grinding.

One object of the invention is to provide an improved construction of copying machine which, while being maintained compact with a wide range of operational functions, will yet avoid congestion at and adjacent to any of the supports. This object is achieved, according to the invention, by providing the machine with a third rotary support which cooperates with apparatus for locating in space the centres of circular arcs to be generated from basic data.

Another object is to provide for the independent rotary adjustments of the several rotary supports necessary for setting the machine either for direct copying from a sample outline, for straight line generation or for the generation of circular arcs. This object is achieved by providing means whereby the third rotary support can, at will, be coupled to the work and copy supports or uncoupled therefrom, and can be locked against, or released for, rotational adjustment.

Yet a further object of the invention is to provide for accurate positioning of the work relatively to the tool in accordance with basic data. This object is achieved by furnishing the copy support with a grid having two sets of mutually perpendicular lines thereon and constituting a reference grid cooperating with a fixed graticule whose origin represents the tool, the scales of the fixed graticule being further subdivided by two adjustable graticule scales inclined to the fixed grid scales.

Figure 10:
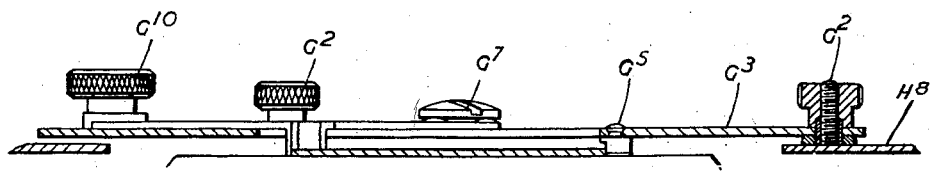
Figure 15:
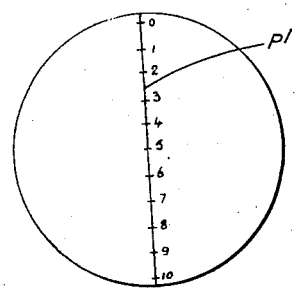
Figure 16:
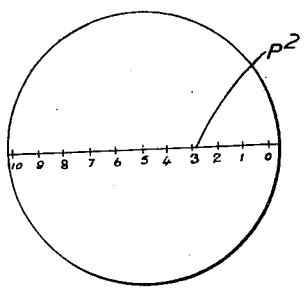
Figure 24:
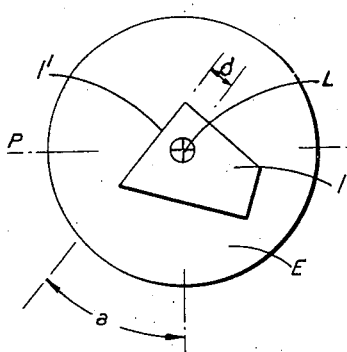
Figure 25:
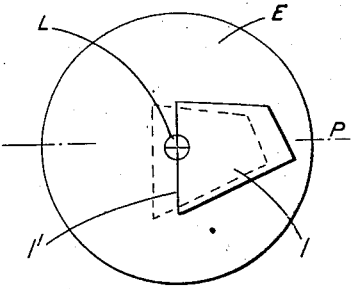

These and other objects of the invention will be apparent from the appended claims and from the following description of the accompanying drawings which illustrate, by way of example, one construction of projection copying machine embodying the invention. In the drawings:

Figure 1 is a front elevation,

Figures 2a and 2b illustrate the machine in vertical section on the line II—II of Figure 5, Figure 3 shows one set of guide rollers for the slides on an enlarged scale, Figure 4 is a vertical section also on an enlarged scale, of one the two coarse adjustment indicators included in Figures 1 and 3, Figure 5 shows the machine in plan, Figures 6 and 7 illustrate diagrammatically, in side elevation and plan respectively, the arrangement of the tapes interconnecting the three rotary shafts, Figure 8 is a plan of the grid included in Figure 2b, Figures 9 and 10 illustrate respectively in plan and vertical section, the contour holder included in Figure 2b, Figure 11 shows the fixed graticule associated with the coordinate setting unit included in Figures 2b and 13 and 14, Figure 12 is a diagrammatic representation of the optical system associated with the copy shaft, the projection screen being, for convenience in illustration, shown turned through 90°, Figures 13 and 14 are sections on the lines XIII—XIII and XIV—XIV respectively of Figure 2b, Figures 15 and 16 show the two movable graticules included in Figures 12 and 14, Figure 17 illustrates in plan, and with parts cut away, the jockey unit and radius arm which can be detachably connected to the control shaft, Figure 18 is a section on the line XVIII—XVIII of Figure 17, Figure 19 is a section on the line XIX—XIX of Figure 17, Figure 20 is a section on the line XX—XX of Figure 17, Figure 21 shows, partly in section, the means for adjusting the draw bar included in Figure 17, Figure 22 illustrates, in vertical section and on an enlarged scale, the anchoring spigot which cooperates with the jockey unit of Figure 17, Figure 23 is a wiring diagram of the circuit through which the linear dimension gauge included in Figures 17 to 20 controls the measuring instrument, Figures 24 and 25 represent diagrammatically the steps for adjusting the machine for straight line grinding, Figures 26 to 30 are diagrams of the images on the screen during successive steps in setting the machine in accordance with two Cartesian coordinates, Figures 31 to 33 show diagrammatically the steps for setting the machine to grind a circular convex arc by translational grinding, the location of the arc being given by Cartesian coordinates, Figures 34 to 36 are similar diagrams in respect of a concave arc, Figures 37 to 39 show diagrammatically the steps for setting the machine to grind a circular convex arc by gyratory grinding, the location of the arc being given by Cartesian coordinates.

Figures 40 to 42 show diagrammatically steps for setting the machine to grind a circular convex arc by translatory grinding, the location of the arc being given by polar coordinates, Figures 43 to 45 are similar diagrams but for gyratory grinding, and Figure 46 shows a modified arrangement of the movable graticule scales.

As shown in Figures 1 to 7 the machine comprises a fixed base or pedestal A provided inside its upper end with four sets of rollers $A^1$ each set comprising a pilot roller $A^2$ (Figure 3) with its axis vertical and two rollers $A^3$ carried by a bracket $A^4$ pivoted at $A^5$, the axis of rotation of the rollers $A^3$ being inclined at an angle approximately 60° to the axis of rotation of the pilot roller $A^2$. Secured beneath a basic slide B are four bearing strips $A^6$ each having its opposite surfaces mutually inclined at an angle of 60° so as to cooperate with the rollers $A^2$, $A^3$. Arranged on the upper surface of the basic slide B are four further sets of rollers $A^2$, $A^3$ cooperating as above described, and as shown in Figure 3, with bearing strips $A^6$ beneath an upper slide or main carriage C, the strips $A^6$ beneath the carriage C being at right angles to those beneath the basic slide B. The basic slide B and the main carriage C are thus horizontally movable relatively to each other in two mutually perpendicular directions, so that the carriage C is capable of translational movement in all horizontal directions relatively to the fixed base A whilst the carriage C always remains parallel to itself. The adjustment of the carriage C relatively to the basic slide B is indicated on a coarse setting scale $C^1$, Figure 4, marked on a transparent window carried by the carriage C and cooperating with an index $C^2$ on a second window $C^3$ carried by the basic slide B illuminated from below by a lamp $C^4$ arranged within a suitable casing $C^5$. A similar coarse setting scale $B^1$ is marked on a transparent window carried by the slide B and cooperating with an index on a second window carried by the base A and illuminated from below by a lamp arranged within a suitable casing $B^5$.

Translational adjustments of the carriage C and basic slide B are effected by feed screws operated by hand wheels $C^6$, $B^6$, respectively. Each hand wheel $C^6$ or $B^6$ is secured to the outer end of an externally screwthreaded shaft whose inner end is journalled in a rotary thrust bearing carried by the basic slide B or base A. The threaded shaft secured to the handwheel $B^6$ cooperates with a screwthread within a tube whose outer end extends freely through an annular collar on the basic slide B which can be contracted on to or released from the said tube by operating or releasing a locking lever $B^7$. Thus, when the lever $B^7$ is operated to tighten the said collar rotation of the handwheel $B^6$ will cause translational movement of the basic slide B towards or away from the operator, whereas when the lever $B^7$ is released the slide B is free to move independently of the handwheel $B^6$ and its feed screw. The handwheel $C^6$ is secured to a horizontal shaft journalled in the basic slide B and acting through a bevel pinion gear on a cross shaft externally threaded to engage a screwthread within a tube carried by the carriage C. The outer end $C^8$ of the said tube extends freely through a collar $C^9$ on the carriage C, a locking lever $C^7$ being provided for contracting the collar $C^9$ on to or releasing it from the end C of the said cross shaft. Thus, by locking the lever $C^7$ operation of the handwheel $C^6$ will cause translational movement of the carriage C in a direction to left or right as viewed by the operator, whereas when the lock $C^7$ is released the carriage C is free to move in the said direction independently of the hand wheel $C^6$.

Arranged on the main carriage C are the upper and lower bearings, $D^{11}$, $D^{12}$ for a work shaft D (Figure 2a) carrying at its upper end a work table E for supporting the work, the shaft D having secured thereto a drum F through which angular movement is transmitted to the work table E, as described below.

The work table E is furnished with a toothed rim $E^1$ engaged by a horizontal pinion operated by a thumb screw $E^4$ (Figure 1) whereby the work table can be turned about the axis of the shaft D and relatively thereto. The upper end of the shaft D has an integral flange $D^1$ which is secured to an annular body $D^2$ carrying an eccentric lock $D^3$ operated by a lever $D^4$ whereby a plate $D^5$, fulcrumed against the stud $D^6$ carried by the body $D^2$, acts on a stud $D^7$ carried by the table E which can, in this way be locked to or unlocked from the shaft D at will. The table E is provided with a pointer $E^2$ which cooperates with a scale $E^3$ carried by the body $D^2$ so that after accurate angular adjustment of the table E about the shaft D, the table can be locked in the desired position of adjustment by the lever $D^4$.

The carriage C is also provided with bearings $G^1$ for a second or copy shaft G (Figure 2b) which is hollow throughout its length and carries at its upper end an open annular frame H, the shaft G also having a driving drum $F^1$ secured thereto. In addition to the bearings for the work and copy shafts D and G, the carriage C is furnished with bearings $J^1$, $J^2$ for a third shaft J, hereinafter referred to as the "control shaft," the three shafts D, G and J being located, as shown in Figure 5, with their vertical axes of rotation in a single plane parallel to the front of the machine.

The upper end of the control shaft J carries a radial flange $J^3$ having an inverted T-bolt $J^4$ which is loaded by a spring whereby the head of the bolt $J^4$ is urged upwards into engagement with an annular groove $F^3$ formed in a radial flange $F^7$ at the upper end of a drum $F^2$ journalled in the carriage C by bearings $J^5$, the shaft J can thus be locked to, or unlocked from the drum $F^2$ by tightening or slackening the nut on the bolt $J^4$. Similarly, the flange $F^4$ has an annular groove $F^5$ in which lies the head of a T-bolt $F^6$ on the carriage C and spring loaded so that by releasing or tightening the nut on the bolt $F^6$ the drum $F^2$ can be released from or locked to the carriage C at will. The arrangement therefore not only provides for release of the shaft J from the drum $F^2$ but also release of the drum $F^2$ from the carriage C, so that the drum $F^2$ can be coupled to the shaft J or to the carriage C, or to both the shaft J and carriage C.

As shown in Figures 6 and 7 the three shafts D, G and J (indicated by their axes) are normally coupled for synchronous angular movement about their respective axes of rotation by means of flexible bands or tapes. One tape $I^1$ is anchored at one end to the drum F associated with the work shaft D and extends, as viewed in plan in Figure 7, in a counter-clockwise direction round this drum, being anchored at its other end to the drum $F^1$ associated with the copy shaft G. The second tape $I^2$ has one end anchored to the periphery of the drum $F^2$ associated with the control shaft J and extends in the clockwise direction to the anchorage point on the drum $F^1$ associated with the copy shaft G, the tape $I^2$ lapping the drums $F^1$ and $F^2$ at a level above the tape $I^1$, as shown in Figure 6. The third tape $I^3$ has one end anchored to the drum F below the tape $I^1$ and extends in the clockwise direction to the other end which is anchored to the drum $F^2$ below the tape $I^2$. In order that the tapes shall extend parallel to each other the drum $F^2$ is slightly deeper than either of the drums F, $F^1$. The length of each tape is such that the sum of the angles of lap of the tape about its two associated drums is not less than 300° for all angular positions of adjustment of the drums.

Thus, while all the drums, and therefore the three supports, can be adjusted through an angular distance of at least 300° all risk of slip in the interconnecting tape drive is avoided since each tape is positively anchored at both ends to its two associated drums. Moreover, the effective axial depth of each drum has only to be sufficient to accommodate two of the tapes, none of which overlaps any part of itself or of any other tape, within the range of adjustment of the drums.

The drum $F^2$ of the control shaft J is furnished at its base with a worm wheel $J^6$ engaged by a worm $J^7$ operated by a hand wheel $J^8$ at the front of the machine, a release lever $J^9$ being provided for throwing the worm $J^7$ into or out of engagement with the worm wheel $J^6$ at will. Thus, assuming that the pin $F^6$ has been released and the pin $J^4$ tightened operation of the hand wheel $J^8$ will cause synchonous rotation of all three drums F, $F^1$ and $F^2$.

The tool which consists of a rotary grinding wheel K, is monted on a horizontal shaft $K^1$ driven by an electric motor $K^2$ as shown in Figures 1 and 5. A casing $K^3$ carrying the shaft $K^1$ and motor $K^2$ is mounted on the head of a plunger (not shown) which is reciprocated in a cylinder forming part of a cross slide $K^4$ which can be adjusted on the slideway $K^5$ by means of a hand wheel $K^6$ in a direction parallel to the plane of the grinding wheel K in order to allow for wear of the wheel K. The slideway $K^5$ is carried by a boss $K^7$ which can be turned, by means of a hand wheel $K^8$, about a horizontal axis $K^9$, passing through the operative point of the grinding wheel K. Thus, by releasing the boss $K^7$ and turning the hand wheel $K^8$ the direction of reciprocation of the grinding wheel can be inclined to the vertical at any desired angle for imparting a rake to the work. Similarly, by turning a hand wheel $K^{10}$ the tool and the reciprocating unit $K^4$ can be swung about an axis parallel to the plane of the grinding wheel.

Mounted on a bracket $L^1$ extending forward from the back of the machine is a work microscope L, and a projection objective $L^2$ is similarly supported by a bracket $L^3$, the optical axis of the objective $L^2$ being deflected, from the vertical by a mirror $L^5$ and thence by way of a mirror $L^6$ at the back of the machine to a translucent screen $L^4$ as described below with reference to Figure 12. The distance between the vertical optical axes of the microscope L and projection objective $L^2$ is exactly equal to the distance between the axes of rotation of the work shaft D and copy shaft G, whilst the plane containing the optical axis of the work microscope and the vertical optical axis of the projection objective, i. e. the "primary plane" above referred to, extends parallel to the vertical plane containing the axes of the three shafts D, G and J for all possible positions of adjustment of the main carriage C relatively to the fixed base A.

The copy frame H at the upper end of the copy shaft G carries a transparent grid M having delineated thereon two sets of lines which are mutually at right angles to each other as shown in Figure 8, these lines thus dividing the grid M into a number of equal squares after the manner of a sheet of graph paper. The centre of the grid M lies in alignment with the axis of rotation of the copy shaft G that is to say in alignment with the optical axis of the projection objective $L^2$ when the carriage C is in its zero position with the line joining the axis of rotation of the three shafts D, J and G in the primary plane indicated at P—P in Figure 5.

Angularly adjustable about the copy frame H is a spider $H^1$ having a radial arm $H^2$ carrying a rotary head $H^3$ for operating a screw $H^5$ engaging a slide $H^6$ slidable along parallel guides formed on the spider $H^1$. The slide $H^6$ carries parallel guides $H^{12}$, at right angles to the guides on the spider $H^1$, and a second slide $H^7$ is adjustable along the guides $H^{12}$ by means of a rotary head $H^4$ carried by the slide $H^6$ and acting on the slide $H^7$ through a screw similar to the screw $H^5$. Thus, by selective operation of the heads $H^3$, $H^4$ the slide $H^7$ can be translationally adjusted in all directions in the horizontal plane. The slide $H^7$ carries a hood $H^8$ having a central opening or window $H^9$ surrounded by a flange or guard $H^{10}$. Detachably secured by three studs $G^2$ (Figures 9 and 10) to the hood $H^8$ within the guard $H^{10}$ is a plate $G^3$ having a central window $G^4$, three fixed fences $G^5$ and a movable fence $G^6$ pivoted at $G^7$ and provided with a resilient finger $G^8$ notched at $G^9$ for engaging one corner of a contour outline support $M^3$ e. g. a photographic transparency bearing a contour or outline $M^4$ which is to be copied. Thus, the support $M^3$ is positioned over the window $G^4$ against the fixed fences $G^5$ whereupon the resilient fence or finger $G^8$ is moved into engagement with the support $M^3$ by turning an eccentric $G^{10}$. The contour $M^4$, having thus been firmly positioned over the window $G^4$, can be adjusted both rotationally and translationally by means of the spider $H^1$ and heads $H^3$, $H^4$ to bring said contour into the desired position as described in more detail below.

Secured by lugs $H^{13}$ to the fixed base A of the machine and below the basic slide B is a coordinate setting unit as described in the specification of United States of America Patent application Serial No. 553,067, filed September 7, 1944, and comprising a housing N having in its upper wall an opening $N^1$ whose central axis coincides with the axis of rotation of the copy shaft G when the carriage C is in its zero position. Secured by brackets $H^{14}$ to the base A is a housing for a lamp $N^2$ from which light is directed through a transparent fixed graticule $O^3$ carried by an end cap $O^4$ mounted on the base of the housing N. As shown in Figure 11 the fixed graticule $O^3$ has delineated thereon two scales $O^1$, $O^2$ which are mutually at right angles to each other. The origin O of these scales will as hereinafter described, at all times represent the operative edge of the tool K where this meets the work on the work table E and, preferably, one or more tool outlines $E^5$ are delineated on the graticule $O^3$ with the part of such outline which represents the operative part of the tool lying at the origin O. Arranged in optical alignment with the origin O of the first graticule $O^3$ and with the axis of the opening $N^1$ are two optical systems $O^5$ (Figure 12) the upper system being housed within a tubular extension $N^3$.

Arranged within the housing N are two transparent movable graticules $P^1$, $P^2$ arranged face to face and which can be moved into alignment with the vertical optical axis, or can be removed therefrom as shown in Figure 12. The arrangement is such that when either or both graticules $P^1$, $P^2$ are in alignment with the optical axis, the fixed graticule $O^3$ and the movable graticule (or graticules) are imaged in the plane of the grid M, i. e. the reference plane. The movable graticules are carried by two slides $P^3$ which are horizontally and relatively adjustable in two mutually perpendicular directions respectively parallel to the two scales $O^1$, $O^2$ of the fixed graticule $O^3$ as imaged in the reference plane. Each graticule slide $P^3$ comprises upper and lower movable members $P^4$, $P^5$ (Figures 13 and 14) and an intermediate fixed member $P^6$ carrying two ball cages the balls in which engage tracks in the members $P^4$, $P^5$. One of these tracks $P^7$ is of V section whilst the other $P^8$ is flat so that centralisation of the slide on the ball tracks is determined by one track only. The two slides $P^3$ are adjusted along their tracks by two knurled heads $A^7$, $A^8$ respectively acting through worm wheels $P^9$ keyed to operating discs $P^{10}$. Formed in the periphery of each disc $P^{10}$ is a short groove $P^{11}$ which receives the ball at one end of a push rod $P^{12}$ whose other end acts on the associated graticule slide $P^3$. Each slide is loaded by a centralising spring $P^{13}$ against which the push rod $P^{12}$ adjusts the slide to one side or the other of the central position.

Figure 28:
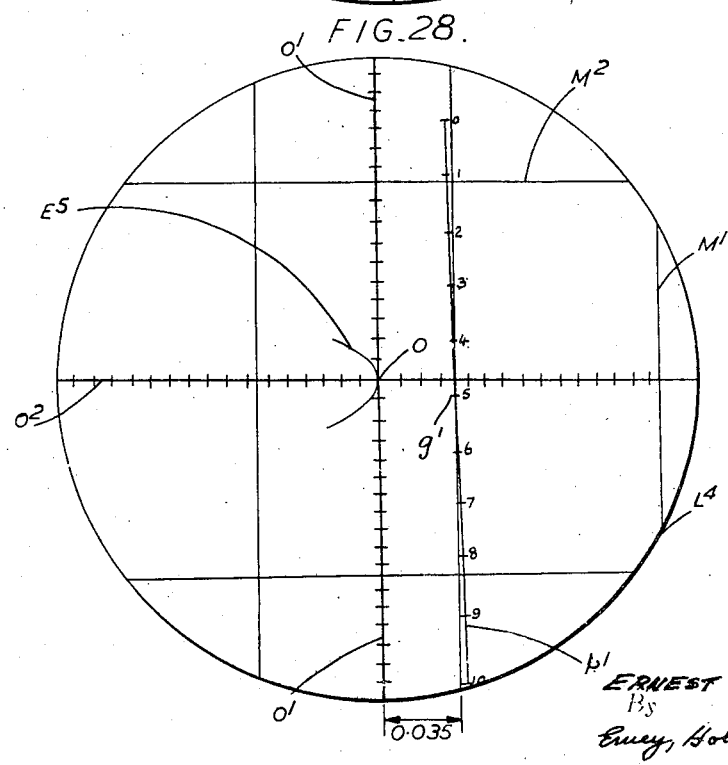
Figure 30:
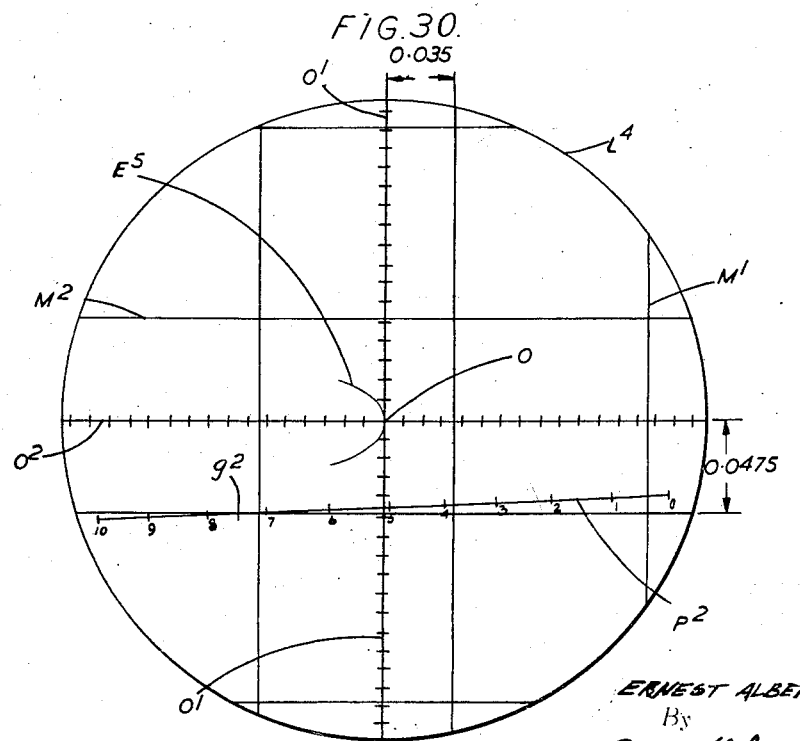

The two scales $P^1$, $P^2$ of the movable graticules (Figures 15 and 16 whilst remaining at right angles to each other with their point of intersection coincident with the optical axis when the slides $P^3$ are both in their central positions as shown in Figure 14), are angularly displaced with respect to the scales $O^1$, $O^2$ of the fixed graticule $O^3$ by an angle whose tangent is represented by one division of the scale on the fixed graticule divided by the total length of the scale. Thus, as shown in Figure 28, the scale $P^1$ is inclined to the angle $p^1$ to the fixed scale $O^1$ the tangent of the angle $p^1$ being represented by one division of the scale $O^1$ divided by the whole length of the scale $O^1$. Similarly, as shown in Figure 30, the tangent of the angle $p^2$ is represented by one division of the scale $O^2$ divided by the whole length of the scale $O^2$.

The fixed scales $O^1$, $O^2$, movable scales $P^1$, $P^2$, grid M and contour $M^4$ (when such is in position) are imaged by the projection objective $L^2$ on the translucent screen $L^4$ as shown in Figure 12, though neither of the scales $P^1$, $P^2$ appears on the screen in this figure since both are withdrawn from the optical axis.

In addition to transmitting the angular movement to the work and copy shafts D and G, the control shaft J is employed for locating, in space, the centre about which circular arcs can be ground from basic data and independently of any outline or copy representation. To this end the control shaft J is provided with apparatus as described in United States of America Patent application Serial No. 552,915 filed September 6, 1944, now Patent No. 2,446,575 dated August 10, 1948. For this purpose the control shaft J carries a spring-loaded axial plug $J^{10}$ (Figure 2b) which fits into a tapered bore $Q^1$ of a radius arm Q having a base $Q^2$ which can be secured by studs $Q^3$ to the flange $F^4$ at the upper end of the control shaft J. The radius arm Q thus lies with its central longitudinal axis extending through and to opposite sides of the axis of rotation of the control shaft J, as shown in Figures 17 to 21, the radius arm Q is provided with guides $Q^4$, $Q^5$ along which can be moved a jockey unit or follower R having in its upper surface a tapered socket $R^1$ for engagement by an anchorage spigot S. The spigot, Figure 22, comprises a hollow spindle $S^1$ having its lower end tapered to fit firmly in the socket $R^1$, and a tension bolt $S^2$ threaded at its lower end to engage a correspondingly threaded boss $S^3$ carried by the jockey unit R. The tension bolt $S^2$ has a tensioning head $S^{13}$ which, when tightened, causes the tapered lower end of the spindle $S^1$ to be firmly driven into the socket $R^1$. As shown in Figures 5 and 23 the spigot assembly S is carried by a support comprising a primary link $S^4$ mounted to pivot at $S^7$ on the bracket $L^1$ which constitutes, in effect part of the fixed base A. A secondary link $S^9$ carrying the spigot assembly S at one end is mounted to pivot at $S^8$ on the primary link $S^4$. The primary link $S^4$ has an arcuate slot $S^5$ struck with the axis of the pivot $S^7$ as centre, and the secondary link $S^9$ has an arcuate slot $S^6$ struck with the axis of the pivot $S^8$ as centre. The bracket $L^1$ carries a bolt operated by a locking lever $S^{10}$, said bolt extending through the associated slot $S^5$ so that when the lever $S^{10}$ is moved into the locked position the primary link $S^4$ is held against angular movement about the primary pivot $S^7$. Similarly the primary link $S^4$ carries a bolt operated by a locking lever $S^{10}$ extending through the associated slot $S^6$ in the secondary link $S^9$ so that when the lever $S^{10}$ is moved into its locked position the link $S^9$ is held against angular movement about the secondary pivot $S^8$. The spigot S is thus adjustable in all directions horizontally within the limits of angular adjustment of the links $S^4$, $S^9$. For the purpose of indicating angular measurements, as hereinafter described, the spigot S carries a pointer $S^{11}$ which cooperates with an arcuate protractor scale $R^2$ on the jockey unit R.

The jockey unit R can be locked in any position of adjustment along the radius arm Q by means of a rotatable shaft $Q^6$ having eccentric portions $Q^{10}$ acting through draw pins $Q^{11}$ on jibs $Q^7$ engaging the guides $Q^4$, $Q^5$ as shown in Figures 17 and 18. Extending through the jockey unit R and throughout the length of the radius arm Q is a draw bar $Q^8$ which can be adjusted longitudinally by an adjustable head $Q^9$ (Figure 21) having a knurled edge and carried at one end of the radius arm Q. The jockey unit R can be locked to or released from the draw bar $Q^8$ as required by a locking spindle $R^3$ having a control nut $R^4$ which, when tightened, causes an enlarged portion of the spindle $R^3$ (Figure 19) to bear against the draw bar $Q^8$.

Housed within the jockey unit R to one side of the central axis thereof is a cradle $R^5$ (Figures 17 and 20) suspended by a pair of parallel spring ligaments $R^6$, this cradle constituting part of a linear dimension gauge as described in the specification of the United States of America Patent application Serial No. 543,536, filed July 5, 1944, now Patent No. 2,412,127, dated December 3, 1946.

The spring ligaments $R^6$ support the cradle $R^5$ so that whilst this can move longitudinally within limits, it will always remain parallel to itself. Supported by and within the cradle $R^5$ is an electromagnetic control device comprising a coil element which includes two balanced coils $T^1$, $T^2$ (Figure 23) and an armature element $T^3$, relative movement of these elements causing relative variation in the reluctance of the magnetic circuits of the two coils $T^1$, $T^2$ which are connected across the secondary $T^4$ of a transformer whose primary $T^5$ is connected to a suitable source of alternating current. Relative variation of the reluctance of the coils causes corresponding operation of a measuring instrument $T^6$ which is connected between the point of interconnection of the coils $T^1$, $T^2$ and a tapping on a resistance $T^7$ across the secondary circuit of the transformer. The instrument $T^6$ is connected to the coils through flexible leads taken through a tubular coupling $T^8$ (Figure 17). Connected to the housing R through a pair of spring ligaments $R^7$ are two levers $R^8$, $R^9$ one of which $R^8$ acts, at one end, through a ball-ended tappit-rod $V^1$ on the coil element $T^1$, $T^2$ carried in a tubular casing $V^2$ (Figure 20), whilst the corresponding end of the lever $R^9$ acts through a ball-ended rod $V^3$ on the armature $T^3$ arranged axially between the coils. The other ends of the levers $R^8$, $R^9$ lie in the path of movement of two stops or collars $V^4$ carried by a feeler rod V which is longitudinally slidable through the housing R in a direction parallel to the length of the radius arm Q. Thus, a force applied to either of the levers $R^8$, $R^9$ by longitudinal movement of the feeler rod V in one direction or the other respectively will cause corresponding relative movement of the armature $T^3$ and coils $T^1$, $T^2$, reactive force for either lever, when the other is being operated, being provided by an adjustable abutment stud $V^5$ carried by the housing R in alignment with the corresponding ball-ended tappit rod $V^1$ or $V^3$.

Adjustable along the guide $Q^5$ of the radius arm Q is an abutment block $V^6$ carrying a longitudinally adjustable stop spindle $V^7$ in alignment with the feeler rod V which, as will be seen from Figure 17, extends from both ends of the housing R. The stop spindle $V^7$ is adjusted relatively to the block $V^6$ by a micrometer head $V^8$ in screw-threaded engagement with the block $V^6$ which can be locked in any position of adjustment along the guide $Q^5$ by a locking stud $V^9$ carried by the abutment block $V^6$.

The machine above described may be employed for a variety of operations and some of these will now be described.

In order to grind a workpiece, which has been positioned on the work table E, in accordance with a given contour or outline, say, the outline $M^4$ indicated in Figures 9 and 12, the radii setting apparatus associated with the control shaft J can be removed from the machine since it is not employed for this operation. Having set the machine to zero by releasing the locks $B^7$, $C^7$ and operating the handwheels $B^6$, $C^6$ until the scales $B^1$, $C^1$ read zero, the fixed graticule scales $O^1$, $O^2$, the grid lines $M^1$, $M^2$ and the tool outline $E^5$ will be imaged on the screen $L^4$ as shown in Figure 12, the origin O of the fixed graticule scales then constituting a fixed datum or tracer which may be regarded as representing the operative edge of the tool K i. e. that point thereof which lies in alignment with the optical axis of the work microscope L. The transparent contour support $M^3$ having been laid against the fences $G^5$ and gripped in position by operating the eccentric $G^{10}$, the contour $M^4$ is brought accurately tangential to the tool outline $E^5$ by turning the spider $H^1$ (directly by hand) for angular adjustment and by operating one or each of the transversing heads $H^3$, $H^4$ to effect translational adjustment. The images now appear on the screen as shown in Figure 12, and, the pin $F^6$ being released whilst the worm $J^7$ is operative and the locks $B^7$, $C^7$ are tightened, the hand wheels $B^6$, $C^6$ and $J^8$ are operated so as to cause the origin or tracer O (i. e. the operative edge of the tool outline $E^5$) to follow the outline $M^4$ on the screen. The tool will then accurately grind the workpiece in accordance with the outline $M^4$, the scale of reproduction being in accordance with the optical ratio of the projection system.

Though it will usually be preferred to utilize the optically projected images for such direct copying, a copy microscope or a stylus may be substituted for the projection objective $L^2$ and the copy outline $M^4$ on the support $M^3$ (or a finished sample which is to be copied) followed by the copy microscope or tracer. Similarly, the outline $M^4$ and also an outline or silhouette of a finished sample may be projected on to the screen $L^4$ for visual comparison of the two outlines on the screen. Further, having projected the contour $M^4$ (or a silhouette of an accurate sample) on the screen, the work may be observed step by step through the work microscope L.

Another use of the machine is for the checking or generation of straight lines on finished work or on a workpiece. For example, as shown in Figures 24 and 25, assuming that a straight line $l^1$ is to be generated on a workpiece $l$, such line lying at a vertical distance $d$ from the centre of the work table E, the carriage C is first brought to its zero position, i. e. with the centre of the work table E in accurate alignment with the optical axis of the work microscope L and the origin O lying on a point of intersection of two of the grid lines $M^1$, $M^2$ as viewed on the screen $L^4$ whilst the two sets of grid lines be accurately parallel respectively to the two fixed graticule scales $O^1$, $O^2$. With the levers $B^7$, $C^7$ and also the pin $F^6$ locked and the latch $D^4$ released, the table E is turned by the pinion $E^4$ through the angle $a$ as measured on the scale $E^3$, and the table E is relocked in this position by locking the latch $D^4$. The required line $l^1$ is now accurately at right angles to the primary plane P—P as shown dotted in Figure 25. The lock levers $B^7$, $C^7$ remaining locked and the hand wheel $C^6$ is operated so as to adjust the carriage C to the right until the grid line M¹ upon which the origin O previously rested has moved along the east portion of the fixed graticule scale O², as viewed on the screen, through the distance $d$. The work is then in the position shown in full lines in Figure 25 and grinding along the line $l^1$ can proceed by operation of the hand wheel B⁶. When the distance $d$ is not a round number directly measurable on the fixed graticule scale O², the fine setting scale P¹ may be brought into use as described below.

Figure 26:
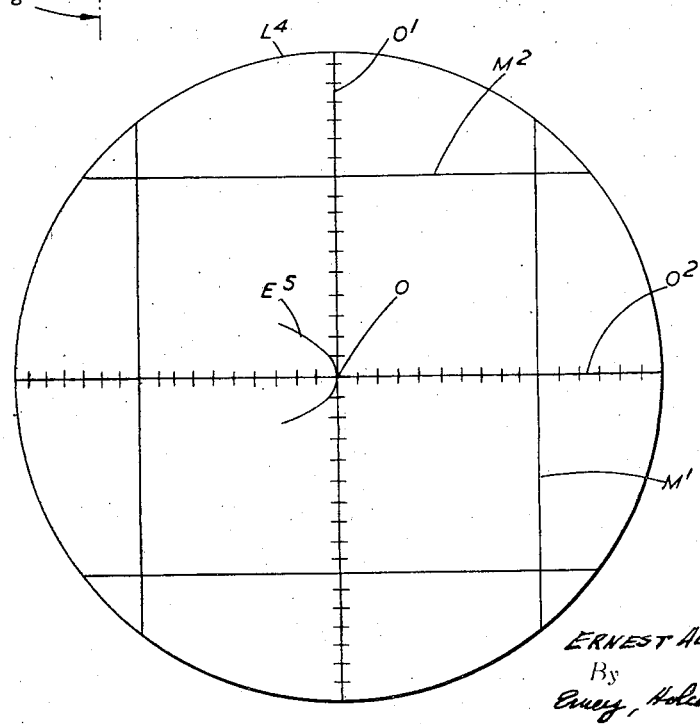
Figure 27:
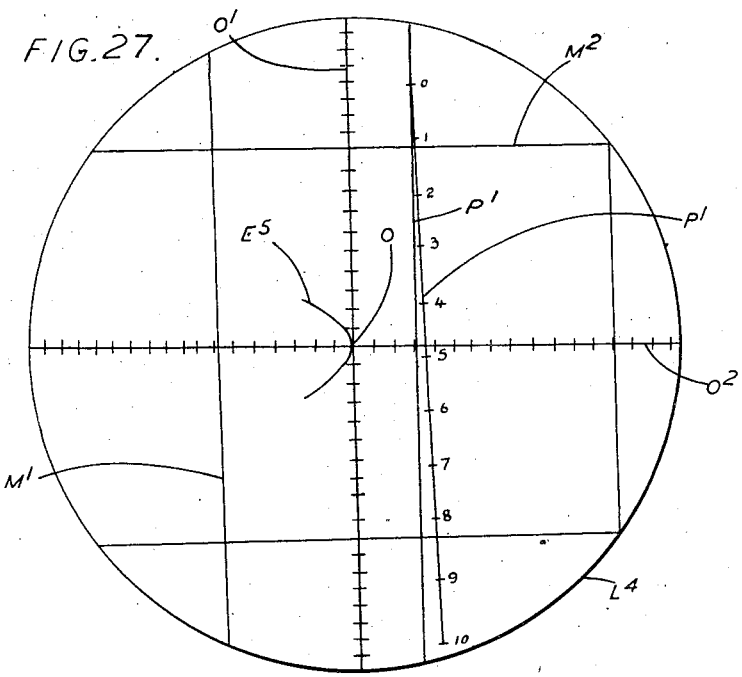
Figure 29:
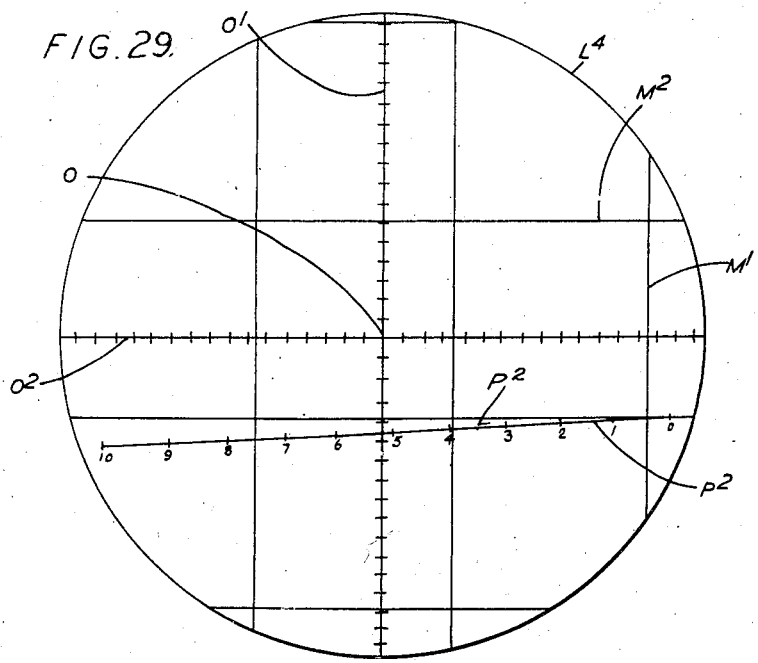

Assuming that it is necessary to set the work relatively to the tool K in accordance with a point whose position relatively to the centre of the copy frame (i. e. the origin O of the two fixed graticule scales O¹, O²) is given by any two Cartesian coordinates, say 0.135 and 0.1475, the carriage C is first brought into its zero position so that the fixed scales O¹, O² lie in coincidence with the crossing grid lines M¹, M² respectively, on the screen L⁴ as shown in Figure 26, the inclined fine setting scales P¹, P² having been adjusted so that neither appears on the screen. The scales B¹ and C¹ now both read zero, the pin F⁶, the latch D⁴ and the levers B⁷, C⁷ being all locked. The basic slide and therefore the carriage C is adjusted, say towards the operator, by the hand wheel B⁶ until the coarse setting scale C¹ reads "1," and the carriage C is adjusted, say to the right, by the hand wheel C⁶ until the scale B¹ reads "1." The fixed scales O¹, O² are then superimposed on another pair of grid lines M¹, M² the appearance on the screen L⁴ being the same as that shown in Figure 26. The carriage C is then adjusted in the same direction as before until the grid line M¹ lying beneath the scale O¹ or any other grid line M¹, has moved along the scale O² through three graduations which represent a setting of 0.03 as shown in Figure 27, whereupon the graticule P¹ is brought on to the screen until the zero of the scale P¹ lies on any convenient grid line M¹. By again adjusting the carriage C in the same direction until the grid line M¹, upon which the zero of the scale P¹ is resting, intersects the scale P¹ at $g^1$, namely the point "0.005" thereon, as shown in Figure 28, the setting of the coordinate 0.135 is complete as represented by the grid line M¹ lying immediately to the right of the origin O. To complete the second coordinate setting the basic slide B, and therefore the carriage C is adjusted, again towards the operator, until the grid line M² previously lying beneath the scale O² (or any other grid line M²) has moved along the scale O¹ through four graduations which represent a setting of 0.04 as shown in Figure 29, and, the scale P¹ having been faded off the screen, the scale P² is brought on until the zero thereof lies on any convenient grid line M². The carriage C is finally adjusted towards the operator by the handwheel B⁶ until the grid line M² upon which the zero of the scale P² is resting intersects the scale P² at the point $g^2$, namely "0.0075" thereon as shown in Figure 30. The centre of the work table R will now lie in a position relatively to the operative edge of the tool K represented by the two Cartesian coordinates 0.135 and 0.1475.

Thus, it will be seen that during measurement the screen L⁴ is at any moment comparatively uncongested since the only permanent markings which are visible are the widely spaced images of the grid lines M¹, M² and the two fixed graticule scales O¹, O², apart from the tool outline E⁵. Since any grid line may be selected for measurement the whole field is available for the use of the movable scales P¹, P² both of which can be faded off and brought on to the screen at will.

When the apparatus is to be used for circular arc grinding the unit R is mounted on the control shaft J and secured thereto by the bolts Q³. Assuming that it is desired to generate a convex circular arc of radius $r$ by translatory generation, the centre of curvature of the arc being given by two Cartesian coordinates (X) and (Y), the carriage C is accurately set in the zero position with the grid orientated so that the grid lines M¹ are at right angles to the primary plane i. e. parallel to the fixed graticule scale O¹ on the screen L⁴, and the radius arm Q is clamped to the drum F² by means of the bolts J⁴. The lock D⁴ is released and the table E is angularly set with the central radius $r$ of the arc to be ground approximately parallel to the primary plane P—P. The machine is now in the zero position, that is to say with the work and copy shaft axes accurately in alignment with the optical axes of the work microscope L and projection objective L² respectively whilst the coarse setting scales B¹ and C¹ both read zero both levers B⁷, C⁷ being locked. On the screen L⁴ will be projected images of the grid lines M¹, M² and of the fixed graticule scales O¹, O² lying in coincidence with two of the grid lines M¹, M². By releasing the spindles Q⁶, R³, inserting the spigot S in the socket R¹, locking the linkage S⁹ and operating the hand wheel C⁶ the radius arm Q is brought into the position parallel to the primary plane, the carriage C being then again restored to the zero position by means of the handwheel C⁶. This initial setting of the radius arm can be checked with the aid of the protractor R². With the spigot still in the socket R¹ but with the linkage released the lever R⁴ is locked and the spindle Q⁸ is rotated, until the central axis of the socket R¹ is approximately coaxial with the control shaft J, the linkage S⁹ being then locked by the nuts S¹⁰ whereupon the lock R⁴ can be released. The accuracy of this centralisation of the jockey unit R can be tested by releasing both locks B⁷, C⁷ and operating the hand wheel J⁸ so that, with the lock F⁶ released and the bolt J⁴ locked, all three shafts D, J and G are angularly oscillated through a small angle, any relative translational movement, on the screen L⁴, between the graticule scales and the grid lines indicating a lack of accuracy in zeroing. Such inaccuracy can then be rectified by locking the jockey unit R to the draw bar Q⁸ and effecting fine adjustment by means of the knurled head Q⁹ until there is no relative translational movement of the grid and graticule images on the screen L⁴ when the shafts are angularly oscillated. The abutment block V⁶ is now adjusted along the radius arm Q until the micrometer spindle V⁷ touches the adjacent end of the feeler rod V, and the block V⁶ is locked to the arm Q by means of the knurled locking stud V⁹, the instrument T⁶ now reading zero. The parts are now in the positions shown diagrammatically in Figure 31.

Having locked the drum F² to the carriage C by means of the bolt F⁶, the nuts S¹⁰ of the spigot linkage are released, the spigot S remaining in the socket R¹, and a gauge block or pack V¹⁰ (Figure 17) having the dimension $(r+r^1)$ is inserted between the stop spindle V⁷ and the adjacent end of the feeler rod V, the value $r^1$ being the radius of curvature of the operative edge of the tool K. Having relocked the lever R⁴, the unit R is adjusted along the radius arm by means of the knurled head Q⁹ until the measuring instrument T⁶ again reads zero. The jockey unit R is thus adjusted to the left, as shown in Figure 32, through the distance $(r+r^1)$. Having clamped the jockey unit R to the radius arm Q in this position of adjustment by means of the spindle Q⁶, the carriage C and basic slide B are adjusted so as to set the apparatus in accordance with the two coordinates (X) and $(Y+r)$ employing the grid and graticule scales on the screen L⁴ as described above. The linkage of the spigot S is then relocked and the radius arm Q is released from the drum F² of the control shaft J by releasing the bolt J⁴, the parts being now in the position shown in Figure 33. Translatory grinding can now proceed by operation of the hand wheels B⁶, C⁶ so that the whole carriage C oscillates translationally, every point on the carriage and therefore on the work table describing the same arcuate path. At the tool E describing the same arcuate path. At the tool K the effect is as if the centre of the arc to be ground and the centre of curvature of the operative edge of the tool K were connected together by a link having the length $(r+r^1)$ so that the loci of the point of contact between the tool and the work follows the curved contour of the edge of the tool and also the curvature of the arc.

For generating a concave circular arc by translatory grinding, utilising Cartesian coordinates, the machine is first set to zero and the work table and grid accurately orientated as above described the radius arm Q being clamped to the drum F² by the bolt J⁴ and the drum F² clamped to the carriage C by the bolt F⁶. The abutment spindle V⁷ now bears against the feeler rod V to the left of the unit R and the instrument T⁶ reads zero, the parts being in the positions shown in Figure 34. Having centralised the socket R¹ and released the spigot linkage S⁹, the spigot S remaining in the socket R¹, the jockey unit R is released from the radius arm Q and a gauge block or pack V⁶ is inserted between the feeler rod V and the spindle V⁷, this gauge block having the dimension $(r-r^1)$. By clamping the jockey unit to the draw bar Q⁸ and adjusting the head Q⁹ until the instrument T⁶ again reads zero the centre of the spigot S is adjusted to the right i. e. away from the tool K, through the distance $(r-r^1)$. The jockey unit R having been reclamped to the radius arm Q the parts are in the positions shown in Figure 35. The two coordinates (X) and $(Y-r)$ are then set by adjustments of the hand wheels B⁶, C⁶ as above described and the spigot linkage S⁹ is relocked the parts then being in the positions shown in Fig. 37. After releasing the radius arm Q from the drum F² by easing the bolt J⁴ translatory grinding can proceed.

The apparatus may also be employed to effect gyratory grinding of circular arcs. For example to grind a convex circular arc of radius $r$ and represented by Cartesian coordinates (X) and (Y), the apparatus is set to zero as above described and the radius arm Q is clamped to the drum F² by tightening the bolt J⁴, the jockey unit R being then also in the zero position and engaged by the spigot S whose linkage S⁹ is locked. The parts are now in the positions shown in Figure 37. The drum F² having been locked, by the bolt F⁶, to the carriage C, and the radius arm Q freed from the drum F² by releasing the bolt J⁴, the jockey unit R is released on the arm Q and the two coordinates (X) and (Y) are set as above described, the parts then being in the positions shown in Figure 38. Having reclamped the jockey unit R to the radius arm Q and relocked the bolt J⁴, the spigot linkage S⁹ is released and the radius $r$ is set by adjusting the carriage C to the right so that the arc to be ground now lies tangential to the operative edge of the tool K as shown in Figure 39. The reading on the graticule scale O² on the screen is now $(Y+r)$. The linkage S⁹ is next reclamped and the bolt F⁶ is released so that by operating the hand wheels B⁶, C⁶ and J⁸ gyratory grinding about the axis of the spigot S, which represents the centre of the arc to be ground on the work table, can proceed.

It will be apparent that for generating a concave arc by gyratory grinding, utilising Cartesian coordinates, the procedure is as described with reference to Figures 37 to 39 except that instead of the coordinate $(Y+r)$ being set on the carriage C, the carriage is set to give the reading $(Y-r)$ on the projection screen.

Instead of employing Cartesian coordinates, as in each of the examples above described, the necessary settings for circular arc grinding may be effected in accordance with polar coordinates, that is to say an angular coordinate $(\theta)$ and a radial coordinate Z which is also represented by $$\sqrt{(X^2+Y^2)}$$

or $$\frac{(X)}{\sin \theta}$$

or $$\frac{(Y)}{\cos \theta}$$

in the terms of the Cartesian coordinates employed in the examples above described.

For example, to effect translatory grinding of a convex circular arc of radius $r$ and whose centre of curvature is located by polar coordinates $(\theta)$ and (Z) the apparatus, including the jockey unit R, is set to zero as already described, the linkage S⁹ being locked and the drum F² of the control shaft J clamped to the carriage C by the bolt F⁶. The parts are now in the position shown in Figure 40. With the spigot S still engaging the socket R¹, the linkage S⁹ is released and the jockey unit is set along the radius arm Q by a gauge pack V¹⁰ having the dimension $(r+r^1)$, and the jockey unit R is locked to the arm Q in this position as shown in Figure 41. By operation of the hand wheel C⁶ the carriage is set to the right through the distance $(Z+r)$ as read off the graticule scale O² on the screen. The spigot linkage S⁹ is relocked and, having released the latch D⁴, the work table E is turned by means of the knurled head E⁴ through the angle $\theta$ as read off the scale E³, and the table is relocked to the work shaft D by means of the latch D⁴. The radius arm Q is now released from the drum F² by easing the bolt J⁴ and, the parts being in the positions shown in Figure 42, translatory grinding can be carried out as already described with reference to Figures 31 to 33.

For generating a concave circular arc by translatory grinding and located by polar coordinates, the method of setting is the same as that described with reference to Figures 40 to 42 except that the abutment block V⁶ and gauge block V¹⁰ are disposed at the opposite end of the jockey unit R and the gauge pack has the dimension $(R-r^1)$, the carriage being set through the distance $(Z-r)$.

Polar coordinates may also be employed for setting the machine for gyratory grinding. Thus, for generating a circular convex arc of radius $r$ and polar coordinates $\theta$ and $Z$ as above described, the machine is set to zero and the spigot linkage $S^9$ is locked with the spigot S engaging the socket $R^1$ in its zero position. The drum $F^2$ of the control shaft J is clamped to the carriage C by means of the bolt $F^6$, and the bolt $J^4$ is released so as to free the radius arm Q from the drum. The parts are now in the positions shown in Figure 43. Having released the jockey unit R on the radius arm Q, the carriage C is adjusted through the distance Z as shown in Figure 44, the jockey unit R being then relocked to the radius arm Q which is relocked to the drum $F^2$. Having released the latch $D^4$ the work table E is adjusted through the angle $\theta$ and relocked thus bringing the centre of the arc to be ground into the primary plane P—P and on the operative edge of the grinding wheel K as shown in Figure 44. After releasing the linkage $S^9$, the carriage C is adjusted (by means of the hand wheel $C^6$) through the distance $r$, the scale $O^1$ on the screen reading $(Z+r)$ so that the arc to be ground is tangential to the operative edge of the tool K as shown in Figure 45. The linkage $S^9$ is now relocked and the drum $F^2$ is released from the carriage C by freeing the bolt $F^6$. The machine is now ready for gyratory grinding to proceed.

The settings for generating a concave circular arc by gyratory grinding using polar coordinates are similar to those described with reference to Figures 43 to 45 except that adjustment of the carriage C is effected through a distance $(Z-r)$ instead of through the distance $(Z+r)$ as above described.

Though it is preferred to employ two independently adjustable inclined graticules such as the graticules $P^1$ and $P^2$ as described above since this facilitates back checking during measurement, both the inclined graticule scales may be marked on one and the same graticule as shown for example at $P^{14}$ in Figure 46. The graticule $P^{14}$ is movable in two mutually perpendicular directions respectively, both normal to the optical axis, one inclined scale $P^{15}$ being first utilised in conjunction with any grid line $M^1$ and when one coordinate measurement has thus been completed the second inclined scale $P^{16}$ is utilised in conjunction with any grid line $M^2$ after which the graticule $P^{14}$ is faded off the screen.

Since the optical references coincide with the zero position of the carriage this will be the normal position of grinding and it will therefore be appreciated that for gyratory grinding, i. e. when the grinding wheel is radially disposed with respect to the work as it rotates, the sum of a co-ordinate and radius is limited by the range of adjustment of the basic slide and carriage, the radius alone being only limited by the length of the radius arm on either side of the centre of rotation of the control shaft. For translatory grinding, that is to say when the orientation of the work relatively to the grinding wheel remains constant throughout the grinding operation, co-ordinate settings are again limited by the range of adjustment of the basic slide and carriage, but limits are not imposed by the radius arm since though the drum of the control shaft is locked to the upper surface of the carriage this drum is released from the control shaft.

According to another method of operation of the machine, an accurate sample of the work to be reproduced is located on the copy or negative holder $G^3$ and a suitable stylus is substituted for the projective objective $L^2$. The stylus is set in contact with the profile of the sample and the stylus is caused to follow this profile by adjustment of the carriage C, translatory movement of the carriage being effected by the feed screws of the basic slide B and carriage C whilst angular movement of the copy and work shafts is effected by operation of the worm $J^7$ associated with the control shaft J. During the grinding operation the work is observed through the work microscope L to ensure that a satisfactory grinding allowance is made. The grinding is continued until the profile has been ground back to the cross lines or datum of the work microscope L.

It will be appreciated that the construction described above is given by way of example only and that details may be modified. For example, the invention is not limited in its practical application to projection copying since the scales associated with the copy support may be viewed directly, as for example, through a copy microscope. Moreover, the reproduction ratio may be determined by the interconnecting mechanism between the three supports alone, or combined with the magnification ratio of the optical projection system. The adjustments of the jockey unit may be effected by the aid of a simple scale associated with the radius arm or by a purely mechanical linear dimension gauge acting between the jockey unit and the radius arm.

What I claim as my invention and desire to secure by Letters Patent is:

1. A copying machine comprising a supporting base, a main carriage on the base, means for translationally adjusting the main carriage relatively to the base, a support for a tool on said base, a datum on the base in spaced relation with respect to the tool, a rotary work support carried by the main carriage adjacent to the tool, a rotary copy support carried by the main cariage adjacent to the datum, a rotary control support carried by the main carriage translational adjustment of the main carriage causing relative translational movement between the three rotary supports, as a unit, and the tool and datum, interconnecting mechanism between the three rotary supports, means whereby rotary movement is applied to the control support and thence through the said interconnecting mechanism to the work support and control support in synchronism, the relative movement between the work support and the tool being a reproduction of the relative movement between the copy support and the datum, and means whereby the control support can be coupled to or uncoupled from the work and copy supports, and can be locked against, or released for, rotary movement, at will.

2. A copying machine comprising a supporting base, a main carriage on the base, means for translationally adjusting the main carriage relatively to the base, a support for a tool on said base, a datum on the base in spaced relation with respect to the tool, a rotary work support carried by the main carriage adjacent to the tool, a rotary copy support carried by the main carriage adjacent to the datum, a third rotary support carried by the main carriage, translational adjustment of the main carriage causing relative translational movement between the three rotary supports, as a unit, and the tool and datum, interconnecting mechanism between the three rotary supports, means whereby rotary movement is applied to one of the rotary supports and thence through the interconnecting mechanism to the other rotary supports in synchronism, the relative movement between the work support and the tool being a reproduction of the relative movement between the copy support and the datum, and apparatus carried by the third support, for locating the centres of circular arcs to be generated, by the tool on the work, from basic data.

3. A copying machine as claimed in claim 2, having means whereby the third support carrying the radii-setting apparatus can be coupled to or uncoupled from the work and copy supports, and can be locked against, or released for, rotary movement.

4. A copying machine comprising a supporting base, a support for a tool on said base, a datum on the base in spaced relation with respect to the tool, a carriage translationally adjustable over the base relatively to a primary plane containing the operative point of the tool and said datum, a work support mounted to rotate on, and translationally movable with, the carriage adjacent to the tool, a copy support mounted to rotate on, and translationally movable with, the carriage adjacent to the datum, the spacing between the work and copy supports being equal to that between the tool and datum, a third support mounted to rotate on, and translationally movable with, the carriage, mechanism interconnecting the three rotary supports, means whereby rotary movement is applied to one of the rotary supports and thence through the interconnecting mechanism to the other rotary supports in synchronism, the relative movement of the work support relative to the tool being a reproduction of the relative movement between the copy support and the datum, and apparatus, carried by said third support, for locating the centres of circular arcs to be generated on the work by the tool from basic data.

5. A copying machine as claimed in claim 4, having means whereby the third support can be coupled to and uncoupled from the work and copy supports, and can be locked against or released for, rotary movement.

6. A copying machine comprising a supporting base, a support for a tool on said base, a datum on the base in spaced relation with respect to the tool, a carriage translationally movable over the base relatively to a primary plane containing the operative edge of the tool and said datum, a work support mounted to rotate on, and translationally movable with, the carriage adjacent to the tool, a copy support mounted to rotate on, and translationally movable with, the carriage adjacent to the datum, the spacing between the work and copy supports being equal to that between the tool and datum, a third or control support mounted to rotate on and translationally movable with, the carriage, mechanism interconnecting the three rotary supports, means whereby rotary movement is applied to the control support and thence through the interconnecting mechanism to the work and copy supports in synchronism, the relative movement between the work support and the tool being a reproduction of the relative movement between the copy support and the datum, apparatus, carried by the control support, for locating the centres of circular arcs to be generated on the work by the tool from basic data, and means whereby the control support can be coupled to or uncoupled from the work and copy supports and can be locked to or unlocked from the carriage.

7. A copying machine as claimed in claim 1, in which the interconnecting mechanism comprises three flexible bands one of which couples two of the rotary supports which lie outermost whilst the other two bands respectively couple the two outermost supports to the intermediate support.

8. A copying machine as claimed in claim 6, in which the three supports are arranged with their axes of rotation in a single plane, the third or control support being arranged between the work and copy supports, and the interconnecting mechanism comprises three flexible tapes one of which couples the work and copy supports whilst the other two tapes respectively couple the work and copy supports to the control support.

9. A copying machine as claimed in claim 2, in which the radii-setting apparatus comprises a radius arm whose longitudinal axis extends through the axis of rotation of the third support, a follower adjustable along said arm, and an anchoring device for engaging the follower in the position of adjustment thereof.

10. A copying machine as claimed in claim 6, in which the apparatus for locating the centres of circular arcs comprises a radius arm whose longitudinal axis extends through the axis of rotation of the control support, a follower adjustable along said arm, and an anchoring device for engaging the follower in the position of adjustment thereof.

11. A copying machine comprising a supporting base, a support for a tool on the base, a datum on the base in spaced relation with respect to the tool, a carriage translationally movable over the base relatively to a primary plane containing the operative edge of the tool and said datum, a work support mounted to rotate on, and translationally movable with, the carriage adjacent to the tool, a copy support mounted to rotate on, and translationally movable with, the carriage adjacent to the datum, the spacing between the work and copy supports being equal to that between the tool and datum, a third or control support mounted to rotate on, and translationally movable with, the carriage, the three rotary supports being arranged with their axes of rotation in a single plane, the third or control support lying between the work and copy supports, interconnecting mechanism comprising three flexible tapes one of which couples the work and copy supports whilst the other two tapes respectively couple the work and copy supports to the intermediate or control support, means for rotating the control support whence rotary motion is transmitted to the work and copy supports in synchronism, the relative movement between the work support and the tool being a reproduction of the relative movement between the copy support and datum, apparatus, carried by the control support, for locating, in space, the centres of circular arcs to be generated on the work by the tool and comprising a radius arm whose longitudinal axis extends through the axis of rotation of the control support, a follower adjustable along the radius arm, means for locking the follower to the radius arm in the desired position of adjustment thereon, and an anchoring device which engages the follower, and means whereby the control support can be coupled to, or uncoupled from, the work and copy supports, and can be locked to or unlocked from the carriage.

12. A copying machine comprising a supporting base, a main carriage on the base, means for translationally adjusting the main carriage relatively to the base, a support for a tool on the base, a datum on the base in spaced relation with respect to the tool, a rotary work support carried by the main carriage adjacent to the tool, a rotary copy support carried by the main carriage adjacent to the datum, a third rotary support carried by the main carriage, translational adjustment of the main carriage causing relative translational movement of the three rotary supports, as a unit, and the tool and datum, interconnecting mechanism between the three rotary supports, means whereby rotary motion is applied to one of the rotary supports and thence through the interconnecting mechanism to the other rotary supports in synchronism, the relative movement between the work support and tool being a reproduction of the relative movement between the copy support and the datum, and apparatus carried by the third support for locating, in space, the centres of circular arcs to be generated on the work by the tool and comprising a radius arm whose longitudinal axis extends through the axis of rotation of the third support, a jockey unit adjustable along the radius arm, means for locking the jockey unit to the arm in the desired position of adjustment thereon, said jockey unit being furnished with one member of a plug and socket coupling whose axis intersects the longitudinal axis of the arm for all positions of adjustment of the jockey unit, and an anchoring device carried by a fixed part of the machine and furnished with the other member of said coupling.

13. A copying machine comprising a supporting base, a support for a tool on the base, a datum on the base in spaced relation with respect to the tool, a carriage translationally movable over the base relatively to a primary plane containing the operative edge of the tool and the said datum, a work support mounted to rotate on, and translationally movable with, the carriage adjacent to the tool, a copy support mounted to rotate on, and translationally movable with, the carriage adjacent to the datum, the spacing between the work and copy supports being equal to the spacing between the tool and datum, a third or control support mounted to rotate on, and translationally movable with, the carriage, mechanism interconnecting the three rotary supports, means whereby rotary movement is applied to the control support and thence through the interconnecting mechanism to the work and copy supports in synchronism, the relative movement between the work support and tool being a reproduction of the relative movement between the copy support and the datum, apparatus, carried by the control support for locating, in space, the centres of circular arcs to be generated on the work by the tool and comprising a radius arm whose longitudinal axis extends through the axis of rotation of the control support, a jockey unit slidable along the radius arm, means for locking the jockey unit to the radius arm in the desired position of adjustment thereon, the jockey unit being furnished with one member of a plug and socket coupling whose axis intersects the longitudinal axis of the arm for all positions of adjustment of the jockey unit, and an anchoring device carried by a fixed part of the machine and carrying the other member of said coupling, and means whereby the control support can be coupled to, or uncoupled from, the work and copy supports, and can be locked to or unlocked from the carriage.

14. A copying machine as claimed in claim 11, in which the follower comprises a jockey unit slidable along the radius arm and furnished with one member of a plug and socket coupling whose central axis intersects the longitudinal axis of the radius arm for all positions of adjustment of the jockey unit, the anchoring device being supported on a fixed part of the machine and having the other member of said coupling.

15. A copying machine as claimed in claim 12, in which the support for the anchoring device comprises a primary link angularly adjustable about a pivot on the fixed base of the machine, and a secondary link which carries the anchoring device and is angularly adjustable about a pivot carried by the primary link, means being provided for locking each of said links against such angular movement.

16. A copying machine comprising a supporting base, a support for a tool on the base, a datum on the base in spaced relation with respect to the tool, a carriage translationally movable over the base relatively to a primary plane containing the operative point of the tool and said datum, a work support mounted to rotate on, and translationally movable with, the carriage adjacent to the tool, a copy support mounted to rotate on, and translationally movable with, the carriage adjacent to the datum, the spacing between the work and copy supports being equal to the spacing between the tool and datum, a third or control support mounted to rotate on, and translationally movable with, the carriage, the three rotary supports being arranged with their axes of rotation in a single plane, the third or control support arranged between the work and copy supports, interconnecting mechanism comprising three flexible bands one of which couples the work and copy supports whilst the other two bands respectively couple the work and copy supports to the intermediate or control support, means for applying rotary movement to the control support whence rotary motion is transmitted through the flexible bands to the work and copy supports in synchronism, the relative movement between the work support and the tool being a reproduction of the relative movement between the copy support and the datum, apparatus, carried by the control support, for locating, in space, the centres of circular arcs to be generated on the work by the tool and comprising a radius arm whose longitudinal axis extends through the axis of rotation of the control support, a jockey unit adjustable along the radius arm, means for locking the jockey unit to the radius arm in the desired position of adjustment thereon, said jockey unit having one member of a plug and socket coupling whose axis intersects the longitudinal axis of the radius arm for all positions of adjustment of the jockey unit, an anchoring device having the other member of said coupling, a support for the anchoring device comprising a primary link angularly adjustable about a pivot on the fixed base of the machine, a secondary link which carries the anchoring device and is angularly adjustable about a pivot carried by the primary link, and means for locking each link against such angular adjustment, and means whereby the control support can be coupled to, or uncoupled from, the work and copy supports, and can be locked to or unlocked from the carriage.

17. A copying machine comprising a supporting base, a main carriage on the base, means for translationally adjusting the main carriage relatively to the base, a support for a tool on the base, a datum on the base in spaced relation with respect to the tool, a rotary work support carried by the main carriage adjacent to the tool, a rotary copy support carried by the main carriage adjacent to the datum, a third rotary support carried by the main carriage, translational adjustment of the main carriage causing relative translational movement between the three rotary supports, as a unit, and the tool and datum, interconnecting mechanism between the three rotary supports, means whereby rotary movement is applied to one of the rotary supports and thence through the interconnecting mechanism to the other two rotary supports in synchronism, the relative movement between the work support and the tool being a reproduction of the relative movement between the copy support and the datum, and apparatus, carried by the third rotary support, for locating the centres of circular arcs to be generated by the tool on the work and comprising a radius arm whose longitudinal axis extends through the axis of rotation of the third support, a follower adjustable along the radius arm, means for locking the follower to the radius arm in the desired position of adjustment thereon, a linear dimension gauge carried by the radius arm for measuring the adjustment of the follower along the radius arm, and an anchoring device supported on the base of the machine and engaging the follower in any position of adjustment thereof.

18. A copying machine, comprising a supporting base, a support for a tool on said base, a datum on the base in spaced relation with respect to the tool, a carriage translationally movable over the base relatively to a primary plane containing the operative edge of the tool and said datum, a work support mounted to rotate on, and translationally movable with, the carriage adjacent to the tool, a copy support mounted to rotate on, and translationally movable with, the carriage adjacent to the datum, the spacing between the work and copy supports being equal to that between the tool and the datum, a third or control support mounted to rotate on and translationally movable with, the carriage, mechanism interconnecting the three rotary supports, means whereby rotary movement is applied to the control support and thence through the interconnecting mechanism to the work and copy supports in synchronism, the relative movement between the work support and the tool being a reproduction of the relative movement between the copy support and the datum, apparatus, carried by the control support, for locating the centres of circular arcs to be generated on the work by the tool from basic data and comprising a radius arm whose longitudinal axis extends through the axis of rotation of the control support, a follower adjustable along the radius arm, means for locking the follower to the arm in the desired position of adjustment thereon, a linear dimension gauge carried by the radius arm for measuring the adjustment of the follower along the arm, and an anchoring device for engaging the follower, and means whereby the control support can be coupled to or uncoupled from the work and copy supports and can be locked to or unlocked from the carriage.

19. A copying machine as claimed in claim 17, in which the linear dimension gauge incorporates an electromagnetic device for controlling an indicating instrument in accordance with the adjustment of the follower along the radius arm.

20. A copying machine as claimed in claim 18, in which the linear dimension gauge incorporates an electromagnetic device for controlling an indicating or recording instrument in accordance with the adjustment of the follower along the radius arm.

21. A copying machine comprising a supporting base, a main carriage on the base, means for translationally adjusting the main carriage relatively to the base, a support for a tool on the base, a datum on the base in spaced relation with respect to the tool, a rotary work support carried by the main carriage adjacent to the tool, a rotary copy support carried by the main carriage adjacent to the datum, a third rotary support carried by the main carriage, translational adjustment of the main carriage causing relative translational movement between the three rotary supports, as a unit and the tool and datum, interconnecting mechanism between the three rotary supports, means whereby rotary movement is applied to one of the rotary supports and thence through the interconnecting mechanism to the two other rotary supports in synchronism, the relative movement between the work support and the tool being a reproduction of the relative movement between the copy support and the datum, a grid carried by the copy support and having two sets of mutually perpendicular lines marked thereon and constituting a reference grid, a graticule carried by a fixed part of the machine and having two mutually perpendicular scales marked thereon, the origin of the fixed scales constituting said datum, two mutually perpendicular graticule scales carried by the base and adjustable thereon in directions parallel respectively to the two fixed graticule scales, each adjustable graticule scale being inclined to the associated fixed graticule scale by an angle whose tangent is represented by one division of the said fixed scale divided by the whole length thereof, the spacings of the grid lines corresponding to the spacings of the graduations of the fixed graticule scales respectively, the grid on the copy support and the fixed and movable scales being located in superimposed optical relationship, and apparatus, carried by the third rotary support, for locating the centres of circular arcs to be generated on the work by the tool from basic data.

22. A copying machine comprising a supporting base, a main carriage on the base, means for translationally adjusting the main carriage relatively to the base, a support for a tool on the base, a datum on the base in spaced relation with respect to the tool, a rotary work support carried by the main carriage adjacent to the tool, a rotary copy support carried by the main carriage adjacent to the datum, a third rotary support carried by the main carriage, translational adjustment of the main carriage causing relative translational movement between the three rotary supports, as a unit, and the tool and datum, interconnecting mechanism between the three rotary supports, means whereby rotary movement is applied to one of the rotary supports and thence through the interconnecting mechanism to the two other rotary supports in synchronism, the relative movement between the work support and the tool being a reproduction of the relative movement between the copy support and the datum, a grid carried by the copy support and having two sets of mutually perpendicular lines marked thereon and constituting a reference grid, a graticule carried by a fixed part of the machine and having two mutually perpendicular scales the outline of at least one tool marked thereon, the origin of the fixed scales constituting said datum, two guides carried by a fixed part of the machine, two movable scales carried by said guides and lying at right angles to each other but inclined to the fixed scales respectively, means for adjusting the said two scales along their guides, the grid and the fixed and movable scales being located in superimposed optical relationship, and apparatus, carried by the third rotary support, for locating the centres of circular arcs to be generated on the work by the tool from basic data.

23. A copying machine as claimed in claim 21, in which the copy support carries a frame furnished with means for positioning thereon a copy of an outline which is to be generated by the tool on the work by direct copying, said means providing for both translational and rotational adjustment of the copy relatively to the grid.

24. A copying machine as claimed in claim 22, in which the copy support carries a frame furnished with means for positioning thereon a copy of an outline which is to be generated by the tool on the work by direct copying, said means providing for both rotational and translational adjustment of the copy relatively to the grid.

25. A copying machine as claimed in claim 21, in which the copy support carries a frame furnished with fences for positioning thereon a copy of an outline which is to be generated by the tool on the work by direct copying, said frame being mounted on two slides carried by the copy support and which are mutually adjustable at right angles to each other and are together angularly adjustable about the axis of rotation of the copy support.

26. A copying machine as claimed in claim 4, in which the rotary work support is furnished with a work table which can be uncoupled from the work support, at will, and angularly adjusted relatively thereto about the axis of rotation of the work support.

27. A copying machine comprising a supporting base, a support for a tool on said base, a datum on the base in spaced relation with respect to the tool, a carriage translationally movable over the base relatively to a primary plane containing the operative edge of the tool and said datum, a work support mounted to rotate on, and translationally movable with the carriage adjacent to the tool, a copy support mounted to rotate on, and translationally movable with, the carriage adjacent to the datum, the spacing between the work and copy supports being equal to that between the tool and the datum, a third or control support mounted to rotate on and translationally movable with, the carriage, mechanism interconnecting the three rotary supports, means whereby rotary movement is applied to the control support and thence through the interconnecting mechanism to the work and copy supports in synchronism, the relative movement between the work support and the tool being a reproduction of the relative movement between the copy support and the datum, apparatus, carried by the control support, for locating the centres of circular arcs to be generated on the work by the tool from basic data, a grid carried by the copy support and having two sets of mutually perpendicular lines marked thereon, a fixed graticule comprising two mutually perpendicular scales marked thereon and whose origin represents said datum, two guides carried by a fixed part of the machine, two movable scales carried by said guides and lying at right angles to each other but inclined to the fixed scales respectively, means for adjusting the said two scales along their guides, the grid and the fixed and movable scales being located in superimposed optical relationship, a work table carried by the work support, means for releasing the work table from the work support, adjusting the work table about the axis of rotation of the work support and relocking the table to the work support in the desired position of angular adjustment, apparatus, carried by the control support for locating the centres of circular arcs to be generated by the tool on the work from basic data, and means whereby the control support can be coupled to or uncoupled from the work and copy supports and can be locked to or unlocked from the carriage.

28. A copying machine as claimed in claim 21, in which means are provided whereby the fixed graticule is imaged at the plane of the grid.

29. A copying machine as claimed in claim 22, in which means are provided whereby the fixed graticule is imaged at the plane of the grid.

30. A copying machine comprising a supporting base, a main carriage on the base, means for translationally adjusting the main carriage relatively to the base, a support for a tool on the base, a datum on the base in spaced relation to the tool, a rotary work support carried by the main carriage adjacent to the tool, a rotary copy support carried by the main carriage adjacent to the datum, a third rotary support carried by the main carriage, translational adjustment of the main carriage causing relative translational movement between the three rotary supports, as a unit, and the tool and datum, interconnecting mechanism, between the three rotary supports, means whereby rotary movement is applied to one of the rotary supports and thence through the interconnecting mechanism to the two other rotary supports in synchronism, the relative movement between the work support and the tool being a reproduction of the relative movement between the copy support and the datum, a grid carried by the copy support and having marked thereon two sets of mutually perpendicular lines, a graticule carried by the base and having marked thereon at least one tool outline and two mutually perpendicular scales whose origin represents said datum, two guides carried by a fixed part of the machine, two movable scales carried by said guides and lying at right angles to each other but inclined to the fixed scales respectively, means for adjusting the said two scales along their guides, a copy frame carried by the copy support and furnished with means for positioning a copy of an outline to be generated on the work by the tool by direct copying, said means providing for both angular and translational adjustment of the copy frame relatively to the grid, an optical system whereby the fixed graticule scales and tool outline are imaged at the plane of the grid for cooperation thereon with the grid lines and with the copy outline, and apparatus, carried by the third rotary support, for locating the centres of circular arcs to be generated by the tool on the work from basic data.

31. A copying machine as claimed in claim 21, in which means are provided whereby the inclined scales are imaged at the plane of the grid.

32. A copying machine as claimed in claim 30, in which means are provided whereby the inclined scales are imaged at the plane of the grid for cooperation with the images of the fixed graticule scales and with the grid lines.

33. A copying machine as claimed in claim 21, in which the two movable graticule scales are inclined to the fixed graticule scales by an angle whose tangent is represented by one division of the fixed graticule scales divided by the length of one such scale.

34. A copying machine comprising a supporting base, a main carriage on the base, means for translationally adjusting the main carriage relatively to the base, a support for a tool on the base, a datum on the base in spaced relation to the tool, a rotary work support carried by the main carriage adjacent to the tool, a rotary copy support carried by the main carriage adjacent to the datum, a third rotary support carried by the main carriage, translational adjustment of the main carriage causing relative translational movement between the three rotary supports, as a unit, and the tool and datum interconnecting mechanism, between the three rotary supports, means whereby rotary movement is applied to one of the rotary supports, and thence through the interconnecting mechanism, to the two other rotary supports in synchronism, the relative movement between the work support and the tool being a reproduction of the relative movement between the copy support and the datum, a grid carried by the copy support and having marked thereon two sets of mutually perpendicular lines, a graticule carried by the base and having marked thereon at least one tool outline and two mutually perpendicular scales whose origin represents said datum, two guides carried by a fixed part of the machine, two movable scales carried by said guides and lying at right angles to each other but inclined to the fixed scales by an angle whose tangent is represented by one division of the fixed graticule scales divided by the length of one such scale, means for adjusting the said two scales along their guides a copy frame carried by the copy support and furnished with means for positioning a copy of an outline to be generated on the work by the tool by direct copying, said means providing for both angular and translational adjustment of the copy frame relatively to the grid, an optical system whereby the fixed and movable graticule scales and tool outline are imaged at the plane of the grid for cooperation thereon with the grid lines and with the copy outline, apparatus, carried by the third rotary support, for locating, in space, the centres of circular arcs to be generated on the work by the tool from basic data, and means for coupling the third support to, or uncoupling it from, the work and copy supports, and for locking the third support against, or releasing it for, rotary adjustment.

35. A copying machine as claimed in claim 21, in which the two inclined scales are marked on a single graticule which is adjustable successively in two mutually perpendicular directions parallel respectively to the two fixed graticule scales.

36. A copying machine as claimed in claim 21, in which the two inclined scales are marked on two graticules respectively adjustable in two mutually perpendicular directions parallel to the two fixed scales respectively.

37. A copying machine as claimed in claim 6, in which the three rotary supports are arranged with their axes of rotation in a single plane, the third or control support being arranged between the work and copy supports, and the interconnecting mechanism comprises three flexible bands one of which couples the work and copy supports whilst the other two bands respectively couple the work and copy supports to the intermediate or control support, the sum of the angles of lap of each band about the two associated supports being not less than 300° for all rotary positions of adjustment of the supports without any part of any one band being superimposed on another part thereof or on any other band.

38. A copying machine comprising a supporting base, a main carriage on the base, means for translationally adjusting the main carriage relatively to the base, a support for a tool on the said base, a datum on the base in spaced relation with respect to the tool, a rotary work support carried by the main carriage adjacent to the tool, a rotary copy support carried by the main carriage adjacent to the datum, a rotary control support carried by the main carriage, translational adjustment of the main carriage thus causing relative translational movement between the three rotary supports, as a unit, and the tool and datum, interconnecting mechanism between the three rotary supports, means whereby rotary movement is applied to the control support and thence through the said interconnecting mechanism to the work support and control support in synchronism, the relative movement between the work support and the tool being a reproduction of the relative movement between the copy support and the datum, means whereby the control support can be coupled to or uncoupled from the work and copy supports, and can be locked against, or released for, rotary movement, at will, two fixed mutually perpendicular scales carried by the fixed supporting base, the point of intersection of the said two fixed scales lying in coincidence with the said datum, a grid carried by the copy support and comprising two mutually perpendicular sets of lines respectively parallel to the two fixed scales, with the spacings of each set of grid lines corresponding to the spacings of the graduations on the fixed scales, and two mutually perpendicular fine-setting scales which are respectively adjustable in directions parallel to the said fixed scales, each fine-setting scale being inclined to one of the fixed scales by an angle whose tangent is represented by one division of the fixed scale divided by the whole length of said fixed scale.

39. A copying machine comprising a supporting base, a support for a tool on said base, a datum on the base in spaced relation with respect to the tool, a carriage translationally movable over the base relatively to a primary plane containing the operative edge of the tool and said datum, a work support mounted to rotate on, and translationally movable with, the carriage adjacent to the tool, a copy support mounted to rotate on, and translationally movable with, the carriage adjacent to the datum, the spacing between the work and copy supports being equal to that between the tool and the datum, a third or control support mounted to rotate on and translationally movable with, the carriage mechanism interconnecting the three rotary supports, means whereby rotary movement is applied to the control support and thence through the interconnecting mechanism to the work and copy supports in synchronism, the relative movement between the work support and the tool being a reproduction of the relative movement between the copy support and the datum, means whereby the control support can be coupled to or uncoupled from the work and copy supports and can be locked to or unlocked from the carriage, two fixed mutually perpendicular scales carried by the fixed supporting base, the point of intersection of the said two fixed scales lying in coincidence with the said datum, a grid carried by the copy support and comprising two mutually perpendicular sets of lines respectively parallel to the two fixed scales, with the spacings of each set of grid lines corresponding to the spacings of the graduations on the fixed scales, and two mutually perpendicular fine-setting scales which are respectively adjustable in directions parallel to the said fixed scales, each fine-setting scale being inclined to one of the fixed scales by an angle whose tangent is represented by one division of the fixed scale divided by the whole length of said fixed scale.

ERNEST ALBERT COOKE.

REFERENCES CITED

The following references are of record in the file of this patent:

UNITED STATES PATENTS

| Number | Name | Date |
| --- | --- | --- |
| 2,179,388 | Taylor et al. | Nov. 7, 1939 |
| 2,206,587 | Taylor | July 2, 1940 |